(12) United States Patent
Li et al.

(10) Patent No.: US 12,532,296 B2
(45) Date of Patent: Jan. 20, 2026

(54) COMMUNICATION METHOD AND APPARATUS

(71) Applicant: HUAWEI TECHNOLOGIES CO., LTD., Guangdong (CN)

(72) Inventors: Qiang Li, Beijing (CN); Yifan Xue, Beijing (CN); Lixia Xue, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 307 days.

(21) Appl. No.: 18/475,850

(22) Filed: Sep. 27, 2023

(65) Prior Publication Data
US 2024/0023071 A1 Jan. 18, 2024

Related U.S. Application Data

(63) Continuation of application No. PCT/CN2022/084670, filed on Mar. 31, 2022.

(30) Foreign Application Priority Data

Apr. 1, 2021 (CN) .......................... 202110365109.5
Apr. 9, 2021 (CN) .......................... 202110385390.9

(51) Int. Cl.
H04W 72/02 (2009.01)
H04W 72/51 (2023.01)
H04W 74/0833 (2024.01)

(52) U.S. Cl.
CPC ........... H04W 72/02 (2013.01); H04W 72/51 (2023.01); H04W 74/0833 (2013.01)

(58) Field of Classification Search
None
See application file for complete search history.

(56) References Cited

U.S. PATENT DOCUMENTS

2019/0364576 A1 11/2019 Wang et al.
2020/0245362 A1 7/2020 Glund et al.
(Continued)

FOREIGN PATENT DOCUMENTS

CN 201248581 Y 6/2009
CN 106465339 A 2/2017
(Continued)

OTHER PUBLICATIONS

M. I. Hossain, A. Azari, J. Markendahl and J. Zander, "Enhanced Random Access: Initial access load balance in highly dense LTE-A networks for multiservice (H2H-MTC) traffic," 2017 IEEE International Conference on Communications (ICC), Paris, France, 2017, pp. 1-7, (Year: 2017).*
(Continued)

Primary Examiner — Daniel F. McMahon
(74) Attorney, Agent, or Firm — Fish & Richardson P.C.

(57) ABSTRACT

A communication method includes: obtaining configuration information, where the configuration information indicates a resource set, the resource set includes a first resource set and/or a second resource set, a resource in the first resource set may be used by a terminal of a first capability type to send a preamble, a resource in the second resource set may be used by a terminal of a second capability type to send a preamble, and the first resource set and the second resource set share at least some resources; selecting a target resource from the resource set, and sending a preamble by using the target resource; then receiving a random access response; and sending first random access information when the shared at least some resources include the target resource, where the first random access information may indicate a capability type of the terminal.

20 Claims, 18 Drawing Sheets

(56) References Cited

U.S. PATENT DOCUMENTS

| | | | |
|---|---|---|---|
| 2021/0144770 A1* | 5/2021 | Tang | H04W 74/0833 |
| 2021/0176781 A1* | 6/2021 | Wang | H04W 74/004 |
| 2022/0015154 A1* | 1/2022 | Wu | H04L 5/0048 |
| 2023/0276503 A1* | 8/2023 | He | H04W 74/0833 370/329 |
| 2025/0267721 A1* | 8/2025 | Han | H04W 72/0453 |

FOREIGN PATENT DOCUMENTS

| | | |
|---|---|---|
| CN | 107495782 A | 12/2017 |
| CN | 107852719 A | 3/2018 |
| CN | 112584515 A | 3/2021 |
| WO | 2016185319 A1 | 11/2016 |
| WO | 2020063229 A1 | 4/2020 |

OTHER PUBLICATIONS

OPPO, "Other considerations for reduced UE capability," 3GPP TSG RAN WG1 #104-e, R1-2100167, e-Meeting, Jan. 25-Feb. 5, 2021, 4 pages.

Extended European Search Report in European Appln. No. 22779110.0, mailed on Aug. 20, 2024, 9 pages.

Ericsson, "UE complexity reduction for RedCap," 3GPP TSG-RAN WG1 Meeting #104-e, Tdoc R1-2100034, e-Meeting, Jan. 25-Feb. 5, 2021, 12 pages.

International Search Report and Written Opinion in International Appln. No. PCT/CN2022/084670, mailed on May 30, 2022, 15 pages (with English translation).

Extended European Search Report in European Appln. No. 22779110.0, mailed on Aug. 20, 2024, 10 pages.

\* cited by examiner (1) Frequency hopping of a message 3

(2) Non-frequency hopping of the message 3

COMMUNICATION METHOD AND APPARATUS

CROSS-REFERENCE TO RELATED APPLICATIONS

This application is a continuation of International Application No. PCT/CN2022/084670, filed on Mar. 31, 2022, which claims priority to Chinese Patent Application No. 202110365109.5, filed on Apr. 1, 2021, and Chinese Patent Application No. 202110385390.9, filed on Apr. 9, 2021. All of the aforementioned patent applications are hereby incorporated by reference in their entireties.

TECHNICAL FIELD

This application relates to the communication field, and in particular, to a communication method and apparatus.

BACKGROUND

In some scenarios, to obtain a communication service, a terminal needs to establish a communication connection to a base station (for example, a gNB). In some solutions, a communication connection between the terminal and the base station may be established through random access (RA). For example, in scenarios such as initial power-on, disconnection, and cell handover, the terminal may establish a communication connection to the base station through random access.

FIG. 1 shows steps of performing random access by a terminal. First, the terminal sends a random access preamble to a base station, which is also referred to as a message 1 (msg1), and indicates that the terminal has an access request. After receiving the preamble from the terminal, the base station sends a random access response (RAR) to the terminal, which is also referred to as a message 2 (msg2). In the msg2, the base station indicates the terminal to send a message 3 (msg3), to help the base station identify an identity of the terminal. After receiving the msg2 from the base station, the terminal sends the msg3 to the base station according to a scheduling indication of the msg2. The msg3 carries information about the terminal, for example, device identification (ID) information, and the msg3 may further carry a radio resource control (RRC) connection establishment request (connection request). After receiving the msg3 from the terminal, the base station may determine the identity of the access terminal based on the information carried in the msg3, and deliver a message 4 (msg4) to the terminal, to complete connection establishment and complete a random access procedure.

Compared with the foregoing terminal (which may be referred to as a common terminal), in some scenarios, in consideration of factors such as power consumption and maintenance costs, some terminals, for example, wearable devices and smart watches, may have relatively low communication capabilities. Such a low-communication-capability terminal may be referred to as a reduced capability terminal. In a scenario in which a reduced capability terminal and a common terminal coexist, to facilitate use of a better scheduling manner for different types of terminals, the terminals need to report respective capability types (a reduced capability or a common capability).

Terminal capability reporting and the random access procedure are usually performed together. In the conventional technology, configuration of random access resources cannot be flexibly optimized in this process.

SUMMARY

Embodiments of this application provide a communication method and apparatus, to improve resource configuration flexibility in a random access procedure.

To achieve the foregoing objective, the following technical solutions are used in this application:

According to a first aspect, a communication method is provided. The communication method may be performed by a terminal or a component (for example, a chip system of the terminal) that can implement a function of the terminal. Using the terminal as an example, the method includes: The terminal obtains configuration information, where the configuration information indicates a resource set, and the resource set includes a first resource set and/or a second resource set; a resource in the first resource set may be used by a terminal of a first capability type to send a random access preamble, and a resource in the second resource set may be used by a terminal of a second capability type to send a random access preamble; and the first resource set and the second resource set share at least some resources. A capability type of the terminal includes the first capability type or the second capability type.

Then, the terminal selects a target resource from the resource set, and sends a preamble by using the target resource. Next, the terminal receives a random access response.

In some cases, when the shared at least some resources include the target resource, it means that the target resource used by the terminal is not only included in a resource pool of the capability type of the terminal, but also included in a resource pool not of the capability type of the terminal. In this case, a base station cannot determine the capability type of the terminal based on the target resource. In this case, the terminal may send first random access information, and indicate the capability type of the terminal by using the first random access information, so that a network device can learn of the capability type of the terminal accordingly.

In the foregoing communication method, on one hand, there are at least some shared resources between resources configured for the terminal of the first capability type and resources configured for the terminal of the second capability type. That is, the resources of the two terminals are not completely isolated. Through configuration, the resources of the two terminals can be completely shared, the resources of the two terminals can be partially shared, and resources of one terminal include resources of the other terminal. In this way, resource configuration flexibility can be improved. It can be learned that the communication method provided in this embodiment of this application can provide a more flexible resource configuration manner for the terminal. On the other hand, for some terminals, that is, terminals whose target resources are not included in the shared resources, the network device may learn of capability types of the some terminals by using a target resource used by a preamble. In other words, the network device can identify the capability types of the terminals as early as possible. Therefore, the terminals can be scheduled as early as possible based on the capability types, so as to improve communication performance of the terminals as early as possible. It can be learned that, in this solution, both communication performance and resource configuration flexibility can be considered as much as possible.

In addition, for some terminals, that is, terminals whose target resources are not included in the shared resources, the network device may learn of capability types of the some terminals by using a target resource used by a preamble. For some other terminals, that is, terminals whose target resources are included in the shared resources, the network device may learn capability types of the terminals by using first random access information. In other words, for different terminals, the network device may learn terminal capability types in different manners. A manner in which the terminal reports the capability type to the network device is more flexible.

In a possible design, when the shared at least some resources do not include the target resource, second random access information is sent, where the second random access information is different from the first random access information.

When the target resource is not included in the shared at least some resources, it means that the target resource used by the terminal is included only in the resource pool corresponding to the capability type of the terminal. In this case, the network device may determine the capability type of the terminal based on the target resource of the preamble from the terminal. Optionally, in this case, the terminal may send the second random access information without carrying capability type information.

In a possible design, the first resource set includes a first random access occasion RO set, and the first RO set includes at least one first RO; the second resource set includes a second RO set, and the second RO set includes at least one second RO; and the first RO is an RO that can be used by a terminal of the first capability type to send a preamble, and the second RO is an RO that can be used by a terminal of the second capability type to send a preamble; and/or the first resource set includes a first preamble set, the first preamble set includes at least one first preamble, and the first preamble is a preamble that can be used by a terminal of the first capability type; and the second resource set includes a second preamble set, the second preamble set includes at least one second preamble, and the second preamble is a preamble that can be used by a terminal of the second capability type; and that the first resource set and the second resource set share at least some resources includes: the first RO set and the second RO set share at least some ROs, and/or the first preamble set and the second preamble set share at least some preambles.

It can be learned that this resource configuration manner provides configuration flexibility, and the network device may flexibly select that PRACH resources are completely separated, partially overlapped, completely overlapped, or the like.

In a possible design, the target resource includes a target RO and a target preamble; and that the shared at least some resources include the target resource includes: the at least some ROs shared by the first RO set and the second RO set include the target RO, and the at least some preambles shared by the first preamble set and the second preamble set include the target preamble.

In a possible design, that the shared at least some resources do not include the target resource includes: the at least some ROs shared by the first RO set and the second RO do not include the target RO, and/or the at least some preambles shared by the first preamble set and the second preamble set do not include the target preamble.

In a possible design, the configuration information may further indicate the at least some ROs shared by the first RO set and the second RO set, or the at least some preambles shared by the first preamble set and the second preamble set, or the at least some ROs shared by the first RO set and the second RO set and the at least some preambles shared by the first preamble set and the second preamble set.

In a possible design, the first random access information includes information indicating the capability type of the terminal. This means that the first random access information may explicitly carry the capability type information of the terminal.

In a possible design, sending the first random access information includes: sending the first random access information on a first time-frequency resource, where the first time-frequency resource is discontinuous in time domain.

In a possible design, sending the first random access information includes: sending the first random access information on a second time-frequency resource, where the second time-frequency resource is continuous in time domain.

This means that the first random access information may implicitly carry the capability type information of the terminal, that is, different terminal capability types are distinguished by using different time-frequency resources. In this way, signaling overheads during capability type reporting can be reduced.

In a possible design, the method further includes: retransmitting the first random access information.

If the network device does not receive the first random access information or fails to parse the first random access information, the network device may schedule the first random access information for retransmission. Optionally, the base station may determine a scheduling policy of the retransmitted first random access information based on the capability type of the terminal. The scheduling policy includes frequency hopping, a frequency domain resource, and the like. For example, if the network device determines, through symbol energy detection, that the terminal is a reduced capability terminal, when scheduling retransmission of the first random access information, the network device may choose not to perform frequency hopping, or may perform frequency hopping within a bandwidth range supported by the reduced capability terminal.

In a possible design, the random access response includes information about a scheduling policy, and the scheduling policy includes any one or a combination of the following policies: frequency hopping or not, a frequency domain resource, a time domain resource, a modulation and coding scheme, and a transmit power control policy.

In a possible design, sending the first random access information includes:
    sending the first random access information according to the scheduling policy indicated by the random access response.

In a possible design, when the shared at least some resources include the target resource, the scheduling policy does not indicate any one or a combination of the following: frequency hopping, a frequency hopping range exceeding a bandwidth supported by the terminal, a frequency domain resource exceeding the bandwidth supported by the terminal, a modulation and coding scheme exceeding a threshold, and transmit power control exceeding a threshold.

For example, the network device is a base station, the terminal of the first capability type is a common terminal, and the terminal of the second capability type is a reduced capability terminal. The base station indicates the reduced capability terminal that a message 2 (carrying a random access response) is to be sent to the reduced capability terminal at a reduced communication rate (a rate that does not exceed a threshold), and may indicate the reduced capability terminal not to perform frequency hopping of a message 3 (carrying random access information), or indicate to perform frequency hopping of a message 3 within a bandwidth supported by the reduced capability terminal, indicate, to the terminal, a frequency domain resource that is used for the message 3 and that is within the supported bandwidth, indicate, to the terminal, a modulation and coding scheme of the message 3 that does not exceed a threshold, and indicate, to the terminal, transmit power control of the message 3 that does not exceed a threshold.

According to a second aspect, this application provides a communication method, applied to a network device or a component (for example, a chip) that can implement a function of the network device, where the method includes: sending configuration information, where the configuration information indicates a resource set, the resource set includes a first resource set and/or a second resource set, a resource in the first resource set may be used by a terminal of a first capability type to send a preamble, a resource in the second resource set may be used by a terminal of a second capability type to send a preamble, and the first resource set and the second resource set share at least some resources; receiving a preamble by using a target resource in the resource set; sending a random access response; and receiving first random access information when the shared at least some resources include the target resource, where the first random access information may indicate a capability type of the terminal, and the capability type of the terminal includes the first capability type or the second capability type.

In a possible design, when the shared at least some resources do not include the target resource, second random access information is received, where the second random access information is different from the first random access information.

In a possible design, the first resource set includes a first random access occasion RO set, and the first RO set includes at least one first RO; the second resource set includes a second RO set, and the second RO set includes at least one second RO; and the first RO is an RO that can be used by a terminal of the first capability type to send a preamble, and the second RO is an RO that can be used by a terminal of the second capability type to send a preamble; and/or the first resource set includes a first preamble set, the first preamble set includes at least one first preamble, and the first preamble is a preamble that can be used by a terminal of the first capability type; and the second resource set includes a second preamble set, the second preamble set includes at least one second preamble, and the second preamble is a preamble that can be used by a terminal of the second capability type; and that the first resource set and the second resource set share at least some resources includes: the first RO set and the second RO set share at least some ROs, and/or the first preamble set and the second preamble set share at least some preambles.

In a possible design, the target resource includes a target RO and a target preamble; and that the shared at least some resources include the target resource includes: the at least some ROs shared by the first RO set and the second RO set include the target RO, and the at least some preambles shared by the first preamble set and the second preamble set include the target preamble.

In a possible design, that the shared at least some resources do not include the target resource includes: the at least some ROs shared by the first RO set and the second RO do not include the target RO, and/or the at least some preambles shared by the first preamble set and the second preamble set do not include the target preamble.

In a possible design, the configuration information may further indicate the at least some ROs shared by the first RO set and the second RO set, or the at least some preambles shared by the first preamble set and the second preamble set, or the at least some ROs shared by the first RO set and the second RO set and the at least some preambles shared by the first preamble set and the second preamble set.

In a possible design, the first random access information includes information indicating the capability type of the terminal.

In a possible design, the receiving first random access information includes: receiving the first random access information on a first time-frequency resource, where the first time-frequency resource is discontinuous in time domain.

In a possible design, the receiving first random access information includes: receiving the first random access information on a second time-frequency resource, where the second time-frequency resource is continuous in time domain.

In a possible design, the method further includes: receiving retransmitted first random access information.

In a possible design, the random access response includes information about a scheduling policy, and the scheduling policy includes any one or a combination of the following policies: frequency hopping or not, a frequency domain resource, a time domain resource, a modulation and coding scheme, and a transmit power control policy.

In a possible design, the receiving first random access information includes: receiving the first random access information according to the scheduling policy.

In a possible design, when the shared at least some resources include the target resource, the scheduling policy does not indicate any one or a combination of the following: frequency hopping, a frequency hopping range exceeding a bandwidth supported by the terminal, a frequency domain resource exceeding the bandwidth supported by the terminal, a modulation and coding scheme exceeding a threshold, and transmit power control exceeding a threshold.

According to a third aspect, this application provides a communication apparatus, applied to a terminal or a component (such as a chip) that can implement a function of the terminal, where the apparatus includes:

a processing unit, configured to: obtain configuration information, where the configuration information indicates a resource set, the resource set includes a first resource set and/or a second resource set, a resource in the first resource set may be used by a terminal of a first capability type to send a preamble, a resource in the second resource set may be used by a terminal of a second capability type to send a preamble, and the first resource set and the second resource set share at least some resources; and select a target resource from the resource set; and a transceiver unit, configured to: send a preamble by using the target resource; and receive a random access response; where the transceiver unit is further configured to: send first random access information when the shared at least some resources include the target resource, where the first random access information may indicate a capability type of the terminal, and the capability type of the terminal includes the first capability type or the second capability type.

In a possible design, when the shared at least some resources do not include the target resource, second random access information is sent, where the second random access information is different from the first random access information.

In a possible design, the first resource set includes a first random access occasion RO set, and the first RO set includes at least one first RO; the second resource set includes a second RO set, and the second RO set includes at least one second RO; and the first RO is an RO that can be used by a terminal of the first capability type to send a preamble, and the second RO is an RO that can be used by a terminal of the second capability type to send a preamble; and/or the first resource set includes a first preamble set, the first preamble set includes at least one first preamble, and the first preamble is a preamble that can be used by a terminal of the first capability type; and the second resource set includes a second preamble set, the second preamble set includes at least one second preamble, and the second preamble is a preamble that can be used by a terminal of the second capability type; and that the first resource set and the second resource set share at least some resources includes: the first RO set and the second RO set share at least some ROs, and/or the first preamble set and the second preamble set share at least some preambles.

In a possible design, the target resource includes a target RO and a target preamble; and that the shared at least some resources include the target resource includes: the at least some ROs shared by the first RO set and the second RO set include the target RO, and the at least some preambles shared by the first preamble set and the second preamble set include the target preamble.

That the shared at least some resources do not include the target resource includes: the at least some ROs shared by the first RO set and the second RO do not include the target RO, and/or the at least some preambles shared by the first preamble set and the second preamble set do not include the target preamble.

In a possible design, the configuration information may further indicate the at least some ROs shared by the first RO set and the second RO set, or the at least some preambles shared by the first preamble set and the second preamble set, or the at least some ROs shared by the first RO set and the second RO set and the at least some preambles shared by the first preamble set and the second preamble set.

In a possible design, the first random access information includes information indicating the capability type of the terminal.

In a possible design, that the transceiver unit is configured to send first random access information includes: sending the first random access information on a first time-frequency resource, where the first time-frequency resource is discontinuous in time domain.

In a possible design, that the transceiver unit is configured to send first random access information includes: sending the first random access information on a second time-frequency resource, where the second time-frequency resource is continuous in time domain.

In a possible design, the transceiver unit is further configured to retransmit the first random access information.

In a possible design, the random access response includes information about a scheduling policy, and the scheduling policy includes any one or a combination of the following policies: frequency hopping or not, a frequency domain resource, a time domain resource, a modulation and coding scheme, and a transmit power control policy.

In a possible design, that the transceiver unit is configured to send first random access information includes:
sending the first random access information according to the scheduling policy indicated by the random access response.

In a possible design, when the shared at least some resources include the target resource, the scheduling policy does not indicate any one or a combination of the following: frequency hopping, a frequency hopping range exceeding a bandwidth supported by the terminal, a frequency domain resource exceeding the bandwidth supported by the terminal, a modulation and coding scheme exceeding a threshold, and transmit power control exceeding a threshold.

According to a fourth aspect, this application provides a communication apparatus, and the communication apparatus may be applied to a network device or a component (for example, a chip) that can implement a function of the network device. The apparatus includes:

a transceiver unit, configured to: send configuration information, where the configuration information indicates a resource set, the resource set includes a first resource set and/or a second resource set, a resource in the first resource set may be used by a terminal of a first capability type to send a preamble, a resource in the second resource set may be used by a terminal of a second capability type to send a preamble, and the first resource set and the second resource set share at least some resources; where the transceiver unit is further configured to receive a preamble by using a target resource in the resource set;

the transceiver unit is further configured to send a random access response; and the transceiver unit is further configured to: receive first random access information when the shared at least some resources include the target resource, where the first random access information may indicate a capability type of a terminal, and the capability type of the terminal includes the first capability type or the second capability type.

In a possible design, when the shared at least some resources do not include the target resource, second random access information is received, where the second random access information is different from the first random access information.

In a possible design, the first resource set includes a first random access occasion RO set, and the first RO set includes at least one first RO; the second resource set includes a second RO set, and the second RO set includes at least one second RO; and the first RO is an RO that can be used by a terminal of the first capability type to send a preamble, and the second RO is an RO that can be used by a terminal of the second capability type to send a preamble; and/or the first resource set includes a first preamble set, the first preamble set includes at least one first preamble, and the first preamble is a preamble that can be used by a terminal of the first capability type; and the second resource set includes a second preamble set, the second preamble set includes at least one second preamble, and the second preamble is a preamble that can be used by a terminal of the second capability type; and that the first resource set and the second resource set share at least some resources includes: the first RO set and the second RO set share at least some ROs, and/or the first preamble set and the second preamble set share at least some preambles.

In a possible design, the target resource includes a target RO and a target preamble; and that the shared at least some resources include the target resource includes: the at least some ROs shared by the first RO set and the second RO set include the target RO, and the at least some preambles shared by the first preamble set and the second preamble set include the target preamble.

That the shared at least some resources do not include the target resource includes: the at least some ROs shared by the first RO set and the second RO do not include the target RO, and/or the at least some preambles shared by the first preamble set and the second preamble set do not include the target preamble.

In a possible design, the configuration information may further indicate the at least some ROs shared by the first RO set and the second RO set, or the at least some preambles shared by the first preamble set and the second preamble set, or the at least some ROs shared by the first RO set and the second RO set and the at least some preambles shared by the first preamble set and the second preamble set.

In a possible design, the first random access information includes information indicating the capability type of the terminal.

In a possible design, that the transceiver unit is configured to receive first random access information includes: receiving the first random access information on a first time-frequency resource, where the first time-frequency resource is discontinuous in time domain.

In a possible design, that the transceiver unit is configured to receive first random access information includes: receiving the first random access information on a second time-frequency resource, where the second time-frequency resource is continuous in time domain.

In a possible design, the transceiver unit is further configured to receive retransmitted first random access information.

In a possible design, the random access response includes information about a scheduling policy, and the scheduling policy includes any one or a combination of the following policies: frequency hopping or not, a frequency domain resource, a time domain resource, a modulation and coding scheme, and a transmit power control policy.

In a possible design, that the transceiver unit is configured to receive first random access information includes:

receiving the first random access information according to the scheduling policy.

In a possible design, when the target resource is included in the shared at least some resources, the scheduling policy does not indicate any one or a combination of the following: frequency hopping, a frequency hopping range exceeding a bandwidth supported by the terminal, a frequency domain resource exceeding the bandwidth supported by the terminal, a modulation and coding scheme exceeding a threshold, and transmit power control exceeding a threshold.

According to a fifth aspect, a communication apparatus is provided. The communication apparatus is configured to implement the foregoing communication methods. The communication apparatus includes a corresponding module, unit, or means (means) for implementing the foregoing communication method. The module, unit, or means may be implemented by hardware, software, or hardware executing corresponding software. The hardware or the software includes one or more modules or units corresponding to the foregoing function.

According to a sixth aspect, a communication apparatus is provided. The communication apparatus includes a processor and a memory. The memory is configured to store computer instructions, and when the processor executes the instructions, the communication apparatus is enabled to perform the communication method according to any one of the first aspect or the second aspect.

According to a seventh aspect, a communication apparatus is provided. The communication apparatus includes a processor. The processor is coupled to a memory, and the processor is configured to read and execute instructions in the memory, so that the communication apparatus performs the communication method in any one of the first aspect or the second aspect.

According to an eighth aspect, a chip system is provided. The chip system includes a processor and an input/output port. The processor is configured to implement a processing function related to the communication method in any one of the first aspect or the second aspect, and the input/output port is configured to implement a transceiving function related to the communication method in any one of the first aspect or the second aspect.

In a possible design, the chip system further includes a memory, and the memory is configured to store program instructions and data for implementing a function related to the communication method in any one of the first aspect or the second aspect.

The chip system may include a chip, or may include a chip and another discrete device.

According to a ninth aspect, a communication system is provided. The system includes one or more terminal devices and a network device.

According to a tenth aspect, a computer-readable storage medium is provided. The computer-readable storage medium stores computer instructions. When the computer instructions are run on a computer, the computer is enabled to perform the communication method according to any one of the first aspect or the second aspect.

According to an eleventh aspect, a computer program product is provided. The computer program product includes a computer program or instructions. When the computer program or the instructions are run on a computer, the computer is enabled to perform the communication method according to any one of the first aspect or the second aspect.

BRIEF DESCRIPTION OF DRAWINGS

FIG. 5-1 is a schematic diagram of a working mechanism of a reduced capability terminal according to an embodiment of this application;

FIG. 5-2 is a schematic diagram of a working mechanism of a common terminal according to an embodiment of this application;

DESCRIPTION OF EMBODIMENTS

For clear and brief descriptions of the following embodiments, a brief description of related technical terms in embodiments of this application is first provided.

1. Messages in a Random Access Procedure 1.1. Msg1

The msg1 may carry a preamble, and is usually sent on a physical random access channel (PRACH). In a possible implementation, a base station specifies some resources for the PRACH. A time-frequency resource used to send the preamble is referred to as a random access occasion (RACH occasion, RO), and may also be referred to as a PRACH transmission opportunity. A name of a resource used to send the preamble is not limited in embodiments of this application.

Figure 2:
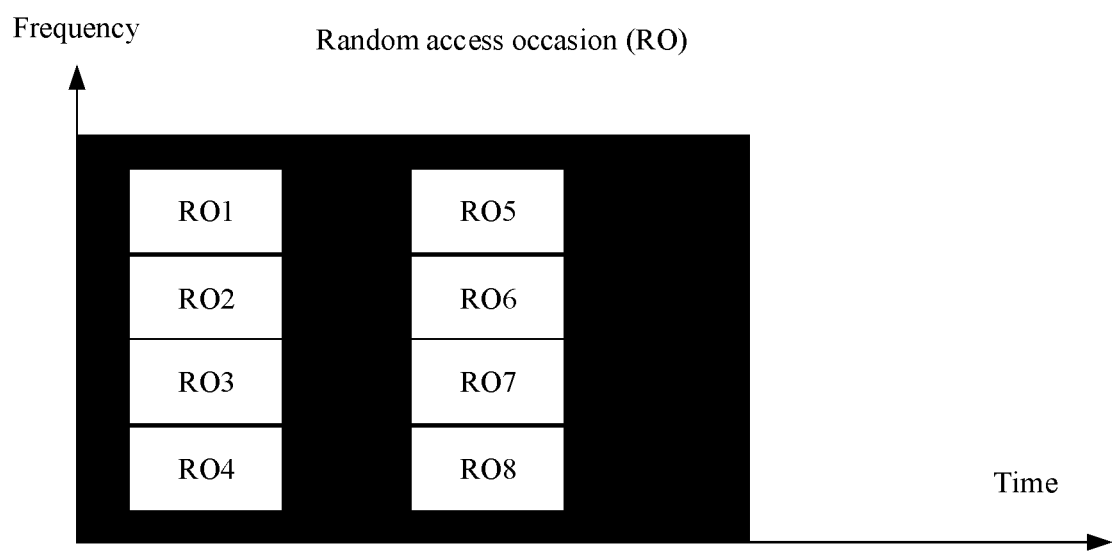
FIG. 2 is a schematic diagram of a random access occasion according to an embodiment of this application.

As shown in FIG. 2, a resource shown by a white block represents an RO, that is, a time-frequency resource used to send a preamble, and a black part may be used to send other data and control signaling, for example, used to send other signaling in a random access procedure.

The resource used to send the preamble further includes a code domain resource of the preamble. The code domain resource or a preamble format may be understood as a specific preamble sequence. Each preamble has its own ID. Preambles with different IDs usually have different sequences and are orthogonal to each other. In this way, if two terminals send different preambles in a same RO, the base station may identify the different preambles.

In a possible implementation, in one RO, a code domain resource or a preamble format that may be used to send a preamble may be specified in a protocol. Alternatively, a code domain resource that may be used by a terminal to send a preamble may be configured by the base station.

Figure 3:
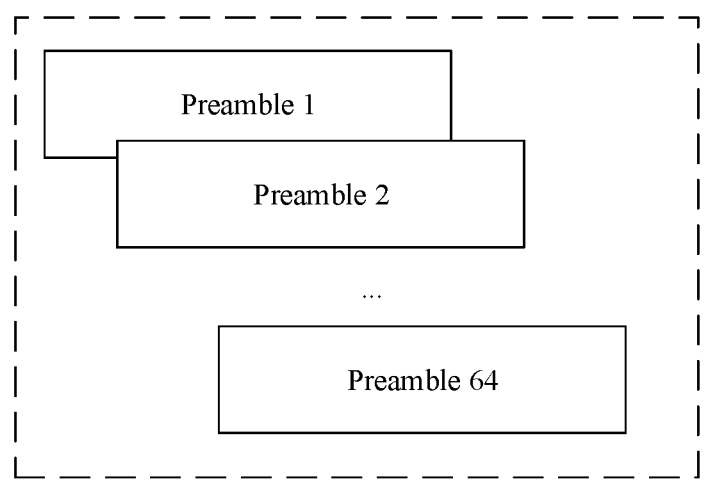
FIG. 3 is a schematic diagram of a random access preamble according to an embodiment of this application.

For example, as shown in FIG. 3, the base station may configure 64 preamble sequences. When performing random access, the terminal randomly selects one preamble sequence (for example, selects a preamble 32) from the 64 preamble sequences configured by the base station. In addition, the terminal selects one RO (for example, RO3) from RO1-RO8 shown in FIG. 2. Then, the terminal may send the preamble 32 on the selected RO (RO3).

In a case in which the base station configures the RO and the preamble code domain resource for the terminal, in a possible implementation, before the random access procedure, the terminal may monitor a broadcast message from the base station, for example, monitor a system information block (SIB) and a master information block (MIB) from the base station, so as to learn of an available RO and preamble sequence.

Generally, because the random access procedure is randomly initiated by a terminal in a cell, a conflict between terminals may exist. For example, at a moment, two different terminals both need to perform random access. If the two terminals select a same RO and a same preamble sequence, preambles sent by the two terminals conflict with each other, and the base station cannot identify access requests of the two terminals. In this case, contention access is usually caused, and it may be determined, in a subsequent step of random access, which terminal succeeds in contention and which terminal fails in contention. If two terminals select different ROs (a same preamble sequence or different preamble sequences) or different preamble sequences (a same RO or different ROs), generally no conflict occurs, and the base station can identify access requests of the two terminals, and contention access is not caused.

1.2. Msg2

After receiving the preamble sent by the terminal, the base station delivers a random access response (carried in the msg2) to the terminal, to schedule the terminal to send msg3. Some information carried in the msg2 is shown in Table 1.

TABLE 1

| Timing advance command | UL grant |
| --- | --- |
| | UL grant |
| | UL grant |
| | UL grant |
| | Temporary C-RNTI |
| | Temporary C-RNTI |

The timing advance command (TAC) is transmit time adjustment information for the terminal.

The temporary cell radio network temporary identifier (C-RNTI) indicates a temporary ID for the terminal, and is used by the terminal for subsequent communication.

The uplink (UL) grant (grant) is used to schedule the terminal to send the msg3. Some indication information of the UL grant in the random access response is shown in Table 2.

TABLE 2

| UL grant field | Number of bits |
| --- | --- |
| Frequency hopping flag (Frequency hopping flag) | 1 |
| Physical uplink shared channel (physical uplink shared channel, PUSCH) frequency domain resource allocation (frequency resource allocation) | 14 |
| PUSCH time domain resource allocation (time resource allocation) | 4 |
| Modulation and coding scheme (modulation and coding scheme, MCS) | 4 |
| Transmit power control command for physical uplink shared channel (transmit power control command for PUSCH, TPC command for PUSCH) | 3 |
| Channel state information request (channel state information request, CSI request) | 1 |

The frequency hopping flag indicates whether frequency hopping is used for the msg3 sent by the terminal.

The PUSCH frequency domain resource allocation indicates a frequency domain location and a bandwidth used for the msg3, for example, but not limited to a subcarrier or the like.

The PUSCH time domain resource allocation indicates a time domain location used for the msg3, for example, but not limited to a slot, a symbol, or the like.

The modulation and coding scheme indicates a modulation and coding scheme used for the msg3, and includes but is not limited to a modulation and coding rate or the like.

The TPC command for PUSCH indicates transmit power adjustment used for the msg3.

The CSI request indicates the terminal to feed back CSI.

It should be noted that, after the base station schedules the terminal to send the msg3, if the base station does not receive the msg3, or receives the msg3 but fails to parse the msg3, the base station schedules the terminal to retransmit the msg3. The base station schedules retransmission of the msg3 and does not use a random access response. Instead, the base station uses downlink control information (DCI) to schedule retransmission of the msg3.

1.3. Msg3

After sending the msg1, the terminal monitors a downlink channel within a specific time, to detect whether there is a random access response for the terminal. After receiving a random access response destined for the terminal, the terminal sends the msg3 based on, for example, the indication information shown in Table 2, in the random access response.

For example, the terminal determines, based on the "frequency hopping flag" field shown in Table 2, whether to use frequency hopping when sending the msg3.

Frequency hopping means that if a sent signal occupies different frequencies, for example, a carrier frequency used to send the signal jumps, for another example, if a sent signal uses different frequencies in different time domains, frequency hopping can be used to obtain diversity gains.

Figure 4:
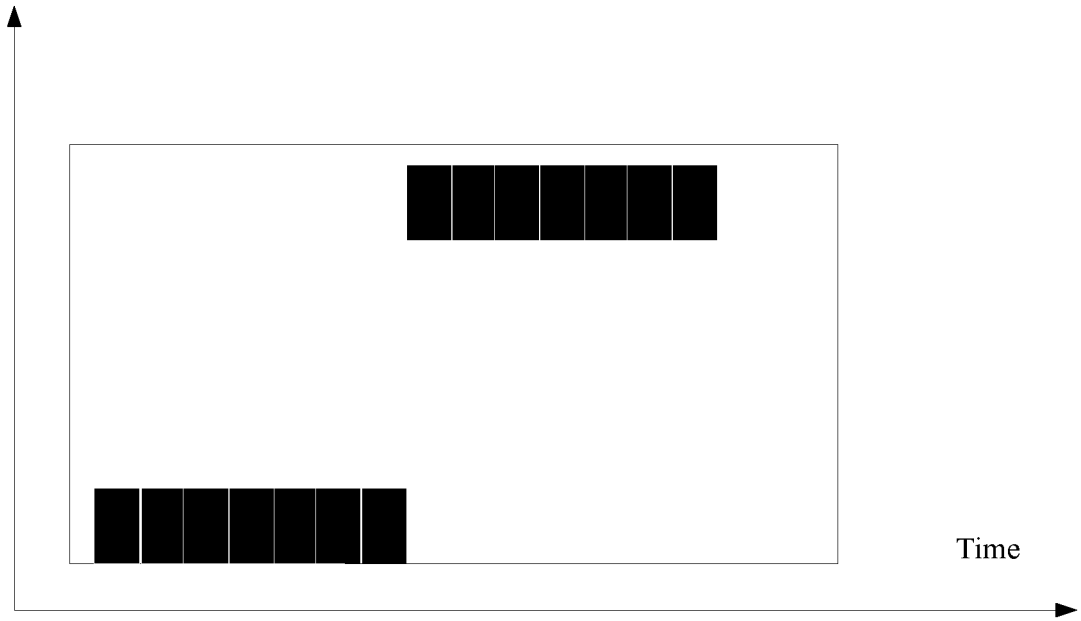
FIG. 4 is a schematic diagram of frequency hopping/non-frequency hopping according to an embodiment of this application.
Figure 4:

For example, as shown in FIG. 4, the msg3 occupies 14 orthogonal frequency division multiplexing (OFDM) symbols in time. If a value of the "frequency hopping flag" field shown in Table 2 is "0", it indicates that a non-frequency hopping manner shown in (2) in FIG. 4 is used, and the 14 OFDM symbols are sent at a same frequency domain location. If the value of the "frequency hopping flag" field shown in Table 2 is "1", it indicates that a frequency hopping manner shown in (1) in FIG. 4 is used, and the 14 OFDM symbols may be sent at different frequency domain locations. For example, the first seven OFDM symbols and the last seven OFDM symbols use different frequency domain locations.

For another example, the terminal determines a sending policy of the msg3 based on other indication information, such as a time-frequency location and an MCS, shown in Table 2 in the random access response.

2. Reduced Capability UE and its Random Access Procedure

To meet different application requirements, in some application scenarios of a wireless cellular communication system, in consideration of factors such as costs and power consumption, a terminal with a strong capability is not required. That is, compared with a high communication capability of a conventional terminal (or referred to as a common terminal or a normal terminal), communication capabilities of some terminals may be designed to be relatively low. For example, wearable devices, children's phone watches, smart manhole covers, smart water meters, and the like have much lower requirements on communication capabilities than high-end smartphones.

The low-capability devices may be referred to as reduced capability user equipment (reduced capability UE) or reduced capability terminals for short.

In consideration of power consumption costs, complexity, and the like, a design specification of a reduced capability terminal may be generally reduced, for example, a communication bandwidth that can be supported may be reduced, and a quantity of antennas that can be supported may be reduced. For example, in a communication frequency band lower than 6 GHz, a normal 5G mobile phone needs to support a 100 MHz bandwidth and four receive antennas, and a reduced capability terminal may need to support only a 20 MHz bandwidth and one receive antenna.

For random access, the reduced capability terminal faces some problems:

1. Due to reduction in the communication capability, communication reliability of the reduced capability terminal is usually poorer than that of the common terminal. For example, if the common terminal has four receive antennas but the reduced capability terminal has only one receive antenna, signal receiving quality of the reduced capability terminal decreases accordingly.

2. Because the supported bandwidth is reduced, the reduced capability terminal has a problem in supporting mechanisms such as frequency hopping. For example, in some scenarios, the base station indicates, in the random access response, the reduced capability terminal to send the msg3 in a frequency hopping manner, and a frequency hopping range exceeds a bandwidth range supported by the reduced capability terminal. In this case, the reduced capability terminal first sends some OFDM symbols, and before remaining OFDM symbols are sent, it is specified that a working frequency needs to be adjusted to a specified frequency domain bandwidth location, and then the remaining OFDM symbols are sent from the specified frequency domain bandwidth location. Working frequency adjustment usually requires a specific time, and an OFDM symbol cannot be transmitted within the time. Therefore, a specific conversion time needs to be specified, and no signal is sent within the conversion time.

Figure 1:
FIG. 1 is a schematic diagram of a random access procedure according to an embodiment of this application.
Figures 1, 5:
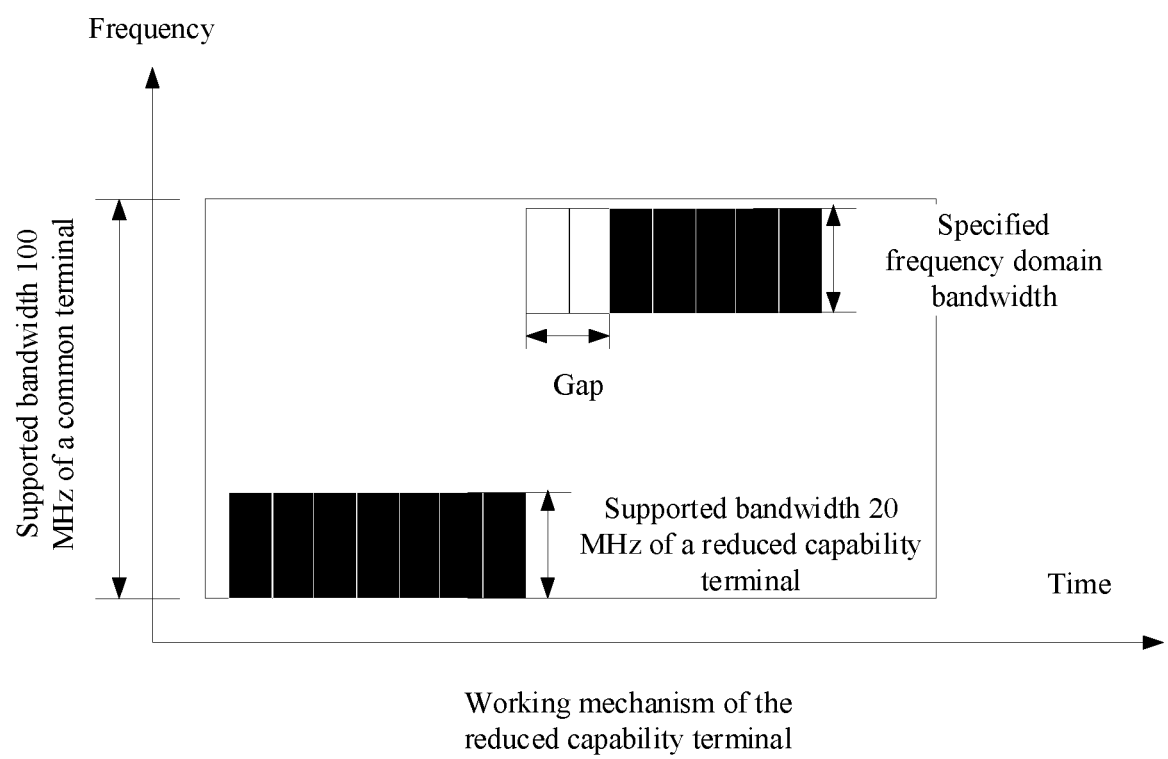
Figures 2, 5:
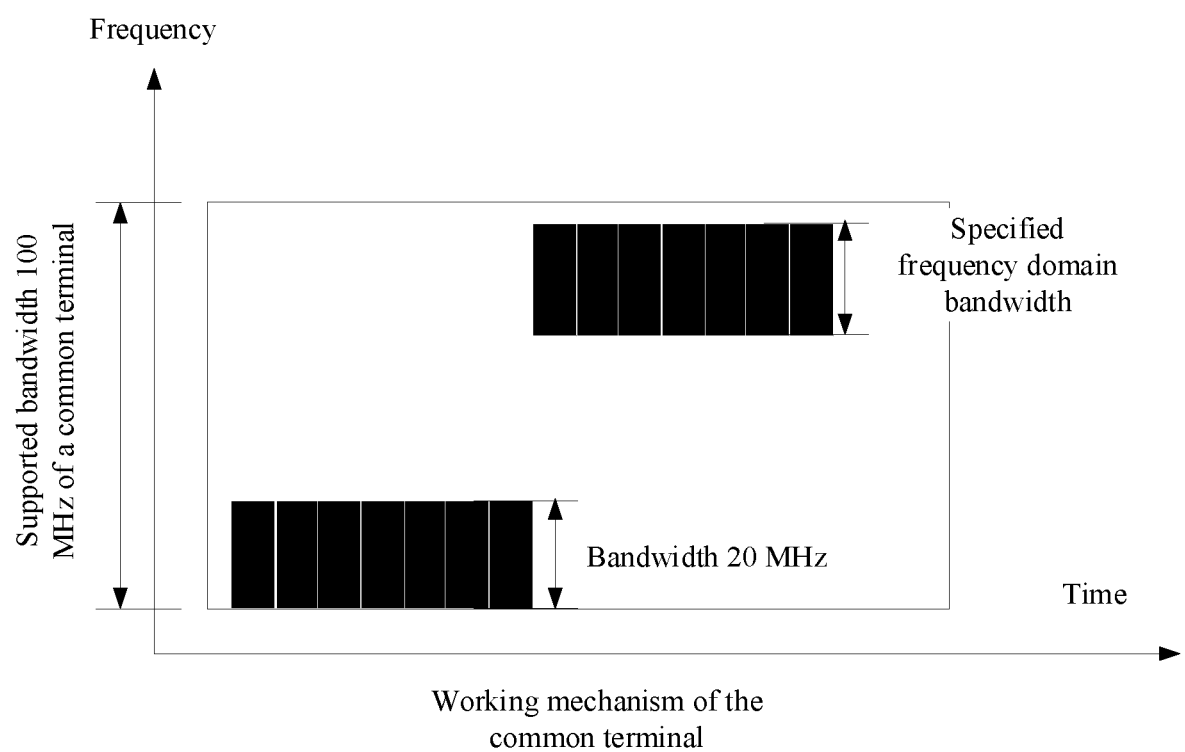

For example, as shown in FIG. 5-1, it is assumed that a bandwidth supported by the reduced capability terminal is 20 MHz, and a bandwidth supported by the common terminal is 100 MHz. After the terminal sends seven symbols, because it takes a specific time to adjust the working frequency, data cannot be transmitted within this time. For example, because the working frequency is adjusted, the eighth and ninth OFDM symbols cannot be transmitted (or the eighth and ninth symbols cannot carry a signal). After the working frequency is adjusted to a specified frequency domain location, the terminal may send the 10th to 14th symbols at the specified frequency domain location. It can be learned that, because the working frequency needs to be adjusted, the signal may be delayed for sending, and a sending gap is formed. Thus, some signals cannot be sent.

For the common terminal, however, usually no gap is formed as shown in FIG. 5-2 because the common terminal supports a wide bandwidth range.

According to the previous analysis, the reduced capability terminal usually faces some problems due to low communication performance. In consideration of different features of the reduced capability terminal and the common terminal, in some solutions, in the random access procedure, the base station may identify a type of a terminal. In this case, in a subsequent step of random access, the base station may treat different types of terminals differently. For example, if the base station knows that a communication object of the base station is a reduced capability terminal, communication reliability may be improved by reducing an information transmission rate or the like. For another example, if the base station knows that a communication object of the base station is a reduced capability terminal, the base station may indicate the reduced capability terminal not to perform frequency hopping, so as to avoid a problem of adjusting a working frequency faced by the reduced capability terminal during frequency hopping.

3. Solution 1 for Identifying a Type of the Terminal in the Random Access Procedure In Solution 1, the base station may identify the type of the terminal based on the msg1 from the terminal. Specifically, mutually isolated PRACH resources are configured for the common terminal and the reduced capability terminal. In this way, the common terminal and the reduced capability terminal send a preamble by using different resources, and the base station may distinguish between types of the terminals by using resources for receiving the preamble.

Figure 6:
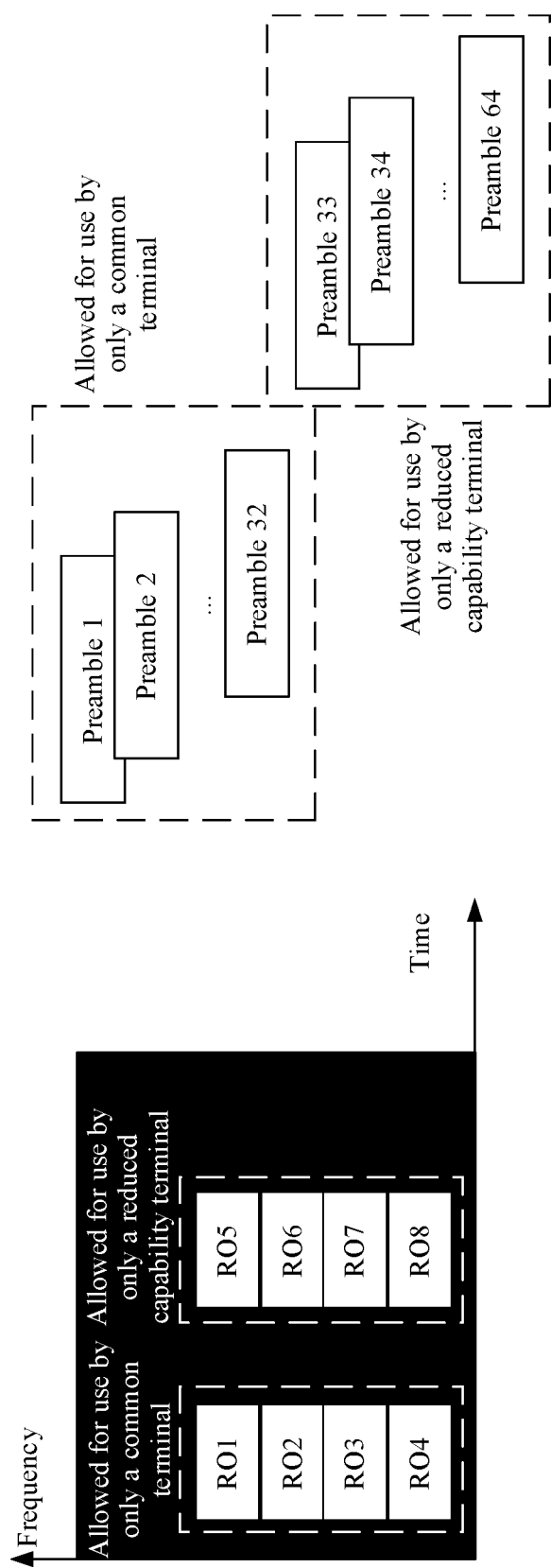
FIG. 6 is a schematic diagram of resource allocation of a random access occasion and a preamble according to an embodiment of this application.

For example, as shown in FIG. 6, the base station may notify the terminal by using a system message (a SIB and/or a MIB) that ROs 1-4 are ROs allocated to the common terminal for sending the preamble, and ROs 5-8 are ROs allocated to the reduced capability terminal. In this way, when initiating random access, the reduced capability terminal selects an RO from the ROs 5-8 to send the preamble. Correspondingly, the base station receives the preamble. If the preamble is received by using any RO in RO5-RO8, the base station may determine that the terminal currently initiating random access is the reduced capability terminal.

Further, as shown in FIG. 6, the base station may notify the terminal by using a system message that preambles 1 to 32 are preambles that can be used by the common terminal, and preambles 33 to 64 are preambles that can be used by the reduced capability terminal. In this way, when initiating random access, the reduced capability terminal randomly selects one preamble from the preambles 33 to 64, and sends the preamble. The base station may determine the type of the terminal based on a sequence range of the received preamble.

After distinguishing between types of terminals, the base station may treat different types of terminals differently in a subsequent step of random access. For example, if it is determined that a communication object is the reduced capability terminal, the base station may not use frequency hopping when scheduling the msg3, so as to avoid a problem that the bandwidth supported by the terminal is insufficient.

A problem of Solution 1 is that a resource allocation manner is not flexible enough because PRACH resources are divided into completely separated parts.

In addition, because resources of the reduced capability terminal and resources of the common terminal are completely isolated, resources that can be used by the reduced capability terminal or the common terminal are limited. If a ratio of terminals with different capabilities in an actual network does not match a resource division ratio, a conflict probability of preamble sending increases. For example, it is assumed that the base station divides PRACH resources into two parts of 1:1, and at some moments, in terminals that actually send a preamble, a ratio of common terminals to reduced capability terminals is 4:1. In this case, a conflict probability of the common terminals is higher.

4. Solution 2 for Identifying a Type of the Terminal in the Random Access Procedure In Solution 2, the base station identifies the type of the terminal based on the msg3 from the terminal. Specifically, the msg3 carries terminal category information. The type of the terminal includes a common terminal or a reduced capability terminal. In this way, when receiving the msg3, the base station may determine the type of the terminal, and perform differentiated treatment in subsequent processing of random access.

Although Solution 2 avoids the problem that resource allocation is not flexible enough in Solution 1, because the type of the terminal cannot be identified as early as possible, the base station cannot perform differentiated processing on the two types of terminals in scheduling of the msg2 and the msg3.

If the base station schedules msg2 and msg3 of different types of terminals in a manner of scheduling msg2 and msg3 of the common terminal, the reduced capability terminal faces some problems. For example, the base station sends the msg2 at a relatively high information transmission rate, and the reduced capability terminal fails to receive the msg2 due to a limited receiving capability. For another example, the base station may indicate the terminal to send the msg3 in the frequency hopping manner. In this case, the reduced capability terminal can implement a frequency hopping process only by adjusting the working frequency. However, because adjusting the working frequency consumes time, some data within the time cannot be sent.

On the contrary, if the base station schedules all terminals in a scheduling manner of the reduced capability terminal, overall efficiency of the network is affected. For example, a relatively low transmission rate is used for all the terminals, and no frequency hopping is performed. In this case, although the reduced capability terminal can normally gain access, for the common terminal, the relatively low transmission rate means that efficiency is reduced, and a frequency diversity gain cannot be obtained when frequency hopping is not performed.

It can be learned that, in the current Solution 1 and Solution 2, when the reduced capability terminal and the common terminal coexist, communication performance and resource configuration flexibility cannot be both ensured.

To resolve the foregoing technical problem, an embodiment of this application provides a communication method. The method may be applied to various wireless cellular communication systems, such as a third generation (3G) mobile communication system, a fourth generation (4G) mobile communication system, a fifth generation (5G) mobile communication system, or a future mobile communication system, for example, applied to a 5G new radio (NR) system.

Figure 7:
FIG. 7 is a schematic diagram of an architecture of a communication system according to an embodiment of this application.

FIG. 7 is a schematic diagram of a communication system to which a technical solution according to an embodiment of this application is applicable. The communication system may include a network device 100 and one or more terminal devices 200 (FIG. 2 shows only one terminal device 200) connected to the network device 100. Data transmission may be performed between the network device and the terminal device.

The network device 100 may be a device that can communicate with the terminal device 200. For example, the network device 100 may be a base station, and the base station may be an evolved NodeB (eNB or eNodeB) in LTE, or may be a base station in NR, a relay station or an access point, a base station in a future network, or the like. This is not limited in embodiments of this application. The base station in NR may also be referred to as a transmission reception point (TRP) or a gNB. In embodiments of this application, the network device may be an independently sold network device, such as a base station, or may be a chip that implements a corresponding function in the network device. In embodiments of this application, a chip system may include a chip, or may include a chip and another discrete device. In the technical solutions provided in embodiments of this application, an example in which an apparatus for implementing a function of the network device is a network device is used to describe the technical solutions provided in embodiments of this application.

The terminal device 200 in this embodiment of this application may be also referred to as a terminal, and may be a device having a wireless transceiving function. The terminal may be deployed on land, including indoor or outdoor, handheld, or in-vehicle. The terminal may alternatively be deployed on a water surface (such as a ship). The terminal may alternatively be deployed in the air (for example, on aircraft, balloons, or satellites). The terminal device may be user equipment (UE). The UE includes a handheld device, an in-vehicle device, a wearable device, or a computing device that have a wireless communication function. For example, the UE may be a mobile phone (mobile phone), a tablet computer, or a computer with a wireless transceiving function. Alternatively, the terminal device may be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, or the like. In embodiments of this application, the terminal device may be an independently sold terminal, or may be a chip in the terminal. In the technical solutions provided in embodiments of this application, an example in which an apparatus for implementing a function of the terminal is a terminal device is used to describe the technical solutions provided in embodiments of this application.

The network device 100 or the terminal device 200 in FIG. 7 in this embodiment of this application may be implemented by using one device, or may be one function module in one device. This is not specifically limited in embodiments of this application. It may be understood that the foregoing functions may be a network element in a hardware device, or may be a software function running on dedicated hardware, or may be a virtualized function instantiated on a platform (for example, a cloud platform), or may be a chip system. In embodiments of this application, a chip system may include a chip, or may include a chip and another discrete device.

Figure 8:
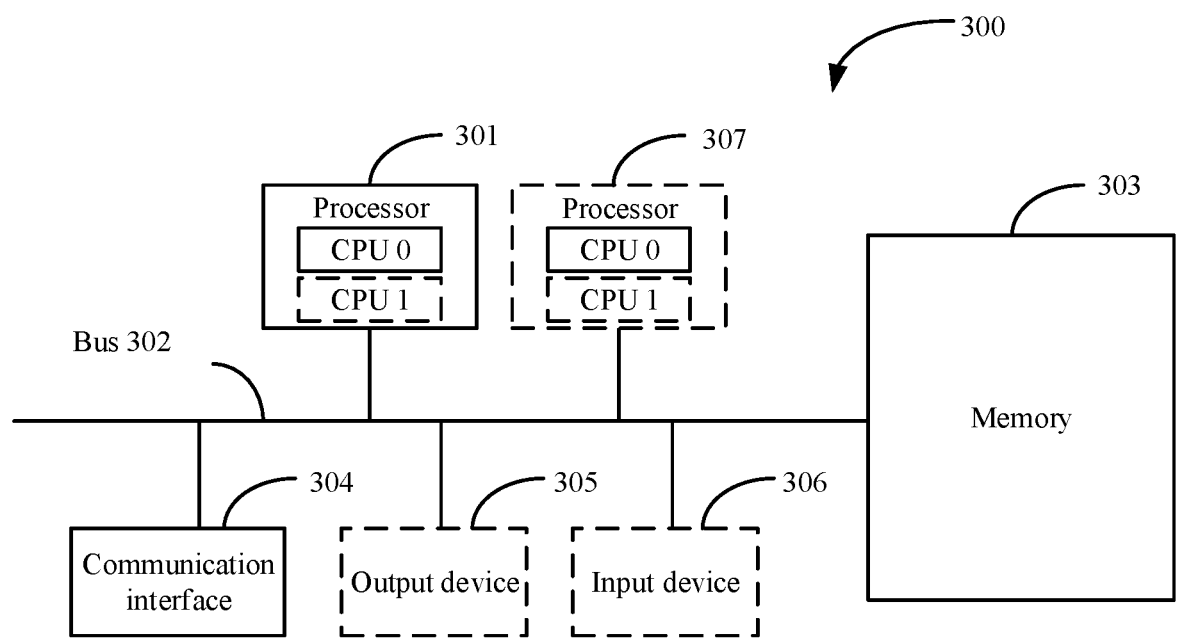
FIG. 8 is a schematic diagram of a structure of a communication apparatus according to an embodiment of this application.

For example, the apparatus for implementing the function of the terminal device or the apparatus for implementing the function of the network device provided in embodiments of this application may be implemented by using an apparatus 300 in FIG. 8. FIG. 8 is a schematic diagram of a hardware structure of the apparatus 300 according to an embodiment of this application. The apparatus 300 includes at least one processor 301 for implementing the function of the terminal device or the network device provided in embodiments of this application. The apparatus 300 may further include a bus 302 and at least one communication interface 304. The apparatus 300 may further include a memory 303.

In embodiments of this application, the processor may be a central processing unit (CPU), a general purpose processor, a network processor (NP), a digital signal processor (DSP), a microprocessor, a microcontroller, a programmable logic device (PLD), or any combination thereof. Alternatively, the processor may be any other apparatus having a processing function, for example, a circuit, a component, or a software module.

The bus 302 may be configured to transfer information between the foregoing components.

The communication interface 304 is configured to communicate with another device or a communication network, for example, the Ethernet, a radio access network (RAN), or a wireless local area network (WLAN). The communication interface 304 may be an interface, a circuit, a transceiver, or another apparatus that can implement communication, which is not limited in this application. The communication interface 304 may be coupled to the processor 301. The coupling in embodiments of this application may be an indirect coupling or a communication connection between apparatuses, units, or modules in an electrical form, a mechanical form, or another form, and is used for information exchange between the apparatuses, the units, or the modules.

In embodiments of this application, the memory may be a read-only memory (ROM) or another type of static storage device that can store static information and instructions, a random access memory (RAM) or another type of dynamic storage device that can store information and instructions, or may be an electrically erasable programmable read-only memory EEPROM), a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer. However, the memory is not limited thereto. The memory may exist independently, or may be coupled to the processor, for example, by using the bus 302. Alternatively, the memory may be integrated with the processor.

The memory 303 is configured to store program instructions, execution of which may be controlled by the processor 301, to implement the communication method provided in the following embodiments of this application. The processor 301 is configured to invoke and execute the instructions stored in the memory 303, to implement the communication method provided in the following embodiments of this application.

Optionally, computer instructions in embodiments of this application may also be referred to as program code. This is not specifically limited in embodiments of this application.

Optionally, the memory 303 may be included in the processor 301.

During specific implementation, in an embodiment, the processor 301 may include one or more CPUs, for example, a CPU 0 and a CPU 1 in FIG. 3.

During specific implementation, in an embodiment, the apparatus 300 may include a plurality of processors, for example, the processor 301 and a processor 307 shown in FIG. 8. Each of the processors may be a single-core (single-CPU) processor, or may be a multi-core (multi-CPU) processor. The processor herein may be one or more devices, circuits, and/or processing cores configured to process data (for example, computer program instructions).

During specific implementation, in an embodiment, the apparatus 300 may further include an output device 305 and an input device 306. The output device 305 is coupled to the processor 301, and may display information in a plurality of manners. For example, the output device 305 may be a liquid crystal display (LCD), a light emitting diode (LED) display device, a cathode ray tube (CRT) display device, a projector, or the like. The input device 306 is coupled to the processor 301, and may receive an input from a user in a plurality of manners. For example, the input device 306 may be a mouse, a keyboard, a touchscreen device, or a sensing device.

The apparatus 300 may be a general-purpose device or a dedicated device. During specific implementation, the apparatus 300 may be a device having a structure similar to that in FIG. 3. A type of the apparatus 300 is not limited in embodiments of this application.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may also be used.

In addition, in embodiments of this application, terms such as "example" and "for example" are used to represent giving an example, an illustration, or a description. Any embodiment or design solution described as an "example" in this application should not be explained as being more preferable or having more advantages than another embodiment or design solution. Exactly, the term "example" is used to present a concept in a specific manner.

In embodiments of this application, terms "information", "signal", "message", "channel", and "signaling" may sometimes be interchangeably used. It should be noted that, meanings expressed by the terms are consistent when differences between the terms are not emphasized. Terms "of", "corresponding (relevant)", and "corresponding" may be interchangeably used sometimes. It should be noted that meanings expressed by the terms are consistent when differences between the terms are not emphasized.

In embodiments of this application, sometimes a word, such as $W_1$, including a subscript may be written in an incorrect form such as W1. Expressed meanings are consistent when differences are not emphasized.

A network architecture and a service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

Some scenarios in embodiments of this application are described by using a scenario in a communication system shown in FIG. 7 as an example. It should be noted that the solutions in embodiments of this application may also be applied to another mobile communication system, and a corresponding name may also be replaced with a name of a corresponding function in the another mobile communication system.

For ease of understanding, the following specifically describes the communication method provided in embodiments of this application with reference to the accompanying drawings.

Figure 9:
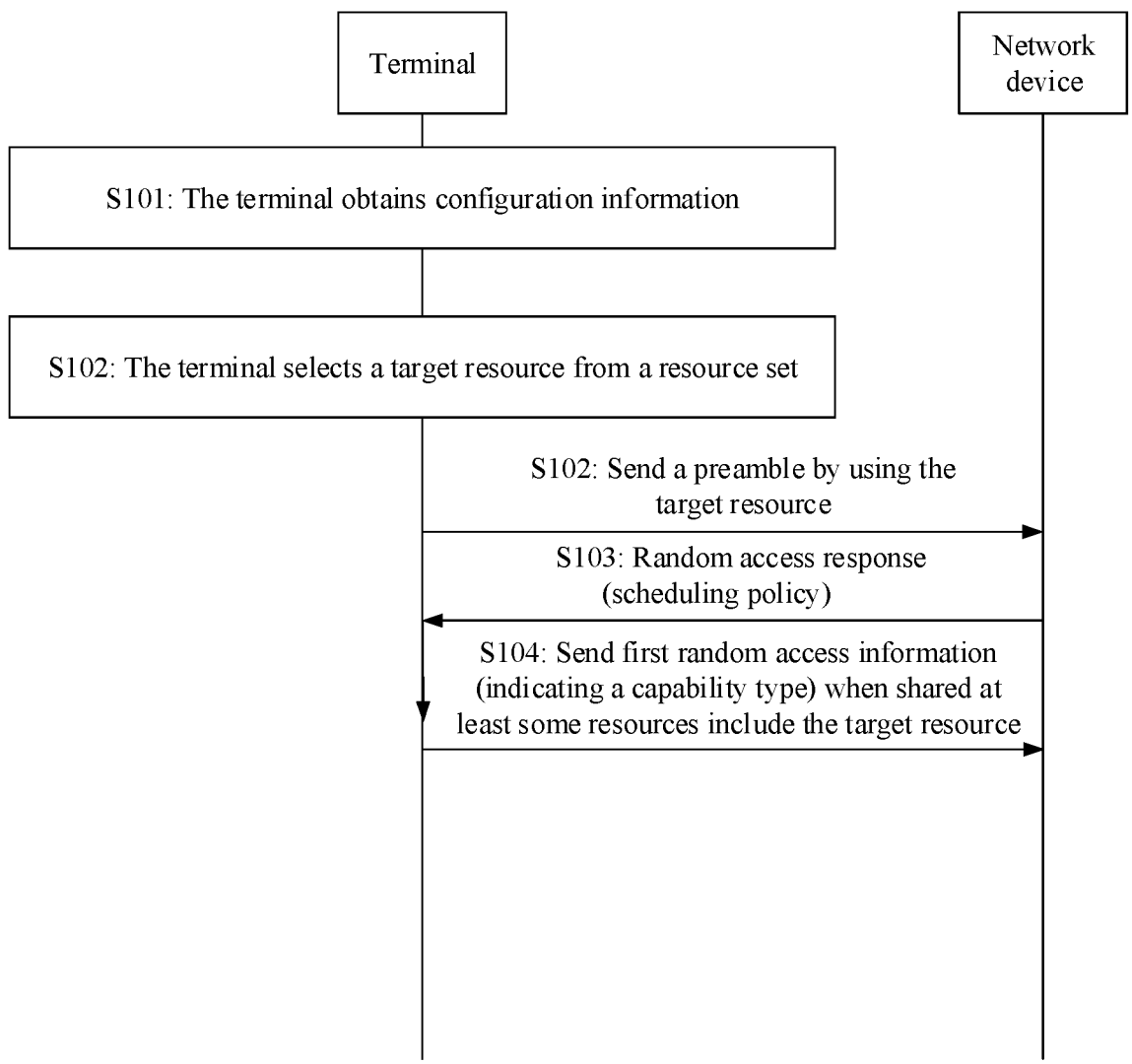
FIG. 9 is a schematic flowchart of a communication method according to an embodiment of this application.

As shown in FIG. 9, an embodiment of this application provides a communication method, including the following steps.

S101: A terminal obtains configuration information.

The configuration information indicates a resource set. The resource set is a PRACH resource set. The resource set includes a first resource set and/or a second resource set. A resource in the first resource set may be used by a terminal of a first capability type to send a random access preamble (which may be briefly referred to as a preamble in this specification), and a resource in the second resource set may be used by a terminal of a second capability type to send a random access preamble. the first resource set and the second resource set share at least some resources. The terminal of the first capability type may be the foregoing common terminal, and the terminal of the second capability type may be the foregoing reduced capability terminal. Resources in the resource set include a time-frequency domain resource and/or a code domain resource. The time-frequency domain resource includes an RO, and the code domain resource includes a preamble sequence.

In a possible implementation, the terminal obtains the configuration information from a network device. The network device includes but is not limited to a base station. For example, the network device is a base station, and the base station uses a broadcast message (a MIB and/or a SIB) to carry the configuration information. The terminal monitors the broadcast message, to obtain the configuration information. Optionally, the configuration information may be represented by using a bitmap in the following embodiments, or may be represented by using a start point field, a length field, or the like in the following embodiments. Specific implementation of the configuration information is not limited in embodiments of this application. The bitmap, the start point, the length field, and the like are described in detail in the following embodiments.

In another possible implementation, some information in the configuration information may be predefined by using a protocol. For example, a preamble sequence in the configuration information is predefined in a protocol.

Alternatively, the terminal may obtain the configuration information in another manner. This is not limited in embodiments of this application.

The configuration information may indicate a PRACH resource set, and the PRACH resource set includes PRACH resources of the common terminal and PRACH resources of the reduced capability terminal.

It should be noted that the PRACH resources for the reduced capability terminal and the PRACH resources for the common terminal are separately configured, that is, the configuration is performed independently. The PRACH resources of the common terminal and the PRACH resources of the reduced capability terminal may be completely separated (no overlapping or shared resource exists), partially overlapped (also referred to as partially shared), or completely overlapped (completely shared), or PRACH resources of a terminal of one capability type include PRACH resources of a terminal of the other capability type. It can be learned that this resource configuration manner provides configuration flexibility, and the network device may flexibly select that PRACH resources are completely separated, partially overlapped, completely overlapped, or the like.

Optionally, the configuration information may further indicate PRACH resources shared by the common terminal and the reduced capability terminal.

It should be noted that, in embodiments of this application, that an xx message "indicates yy" means that the xx message may indicate yy, but does not mean that the xx message is dedicated to indicating yy. A unified description is provided herein and details are not described below again.

The following specifically describes the first resource set that can be used for the common terminal and the second resource set that can be used for the reduced capability terminal.

The first resource set includes a first RO set, and the first RO set includes at least one first RO; the second resource set includes a second RO set, and the second RO set includes at least one second RO; the first RO is an RO that can be used by the terminal of the first capability type to send the random access preamble, and the second RO is an RO that can be used by the terminal of the second capability type to send the random access preamble; and the first RO set and the second RO set are separately configured; and/or the first resource set includes a first preamble set, the first preamble set includes at least one first preamble, and the first preamble is a random access preamble that can be used by the terminal of the first capability type; the second resource set includes a second preamble set, the second preamble set includes at least one second preamble, and the second preamble is a random access preamble that can be used by the terminal of the second capability type; and the first preamble set and the second preamble set are separately configured.

That the first resource set and the second resource set share at least some resources includes: the first RO set and the second RO set share at least some ROs, and/or the first preamble set and the second preamble set share at least some preambles.

In other words, the PRACH resource set has at least the following several configuration manners:

1. The first resource set includes the first RO set, and the second resource set includes the second RO set. The first RO set and the second RO set share at least some ROs.

For example, the network device is a base station. For the time-frequency domain resources ROs in the PRACH resources, the base station may indicate the configuration information to the terminal by using a system message. Optionally, the configuration information may further indicate ROs belonging to a shared part (that is, RO1-RO4), and/or indicate ROs not belonging to the shared part. For example, as shown in (1) in FIG. 10, the base station may indicate time-frequency domain locations of RO1-RO8 configured for the common terminal. RO1-RO8 include two parts, where RO1-RO4 are ROs allowed for use by only the common terminal, and RO5-RO8 are ROs shared by the common terminal and the reduced capability terminal, that is, ROs that can be used by both the common terminal and the reduced capability terminal.

Optionally, the network device may determine the configuration information based on a network status. In a possible design, the network device determines the configuration information based on an actual online terminal ratio, a resource shortage degree, and the like.

For example, at some moments, in terminals that actually send a preamble, a ratio of common terminals to reduced capability terminals is 4:1. In this case, in consideration that a conflict probability of the common terminals is higher, more PRACH resources may be allocated to the common terminals.

Similarly, the base station may indicate, in the configuration information of the system message for the reduced capability terminal, time-frequency domain locations of RO1-RO12 configured for the reduced capability terminal. The ROs that can be used by the reduced capability terminal include two parts, where RO9-RO12 are ROs allowed for use by only the reduced capability terminal, and RO5-RO8 are ROs shared by the common terminal and the reduced capability terminal. Optionally, the configuration information may further indicate ROs not belonging to shared use (that is, RO9-RO12), and/or indicate ROs belonging to shared use (that is, RO5-RO8).

For the code domain resources in the PRACH resources, the common terminal and the reduced capability terminal share the preamble sequence. In this way, the base station cannot distinguish between different types of terminals only based on a received preamble. As shown in (2) in FIG. 10, the common terminal and the reduced capability terminal share preambles 1-64, that is, the common terminal may use any preamble in the preambles 1-64, and the reduced capability terminal may also use any preamble in the preambles 1-64. Optionally, the preambles 1-64 may be configured by the network device (for example, the base station) for the terminal, or may be predefined by a protocol. A specific implementation in which the terminal obtains the preamble code domain resource is not limited in this embodiment of this application.

Figure 10:
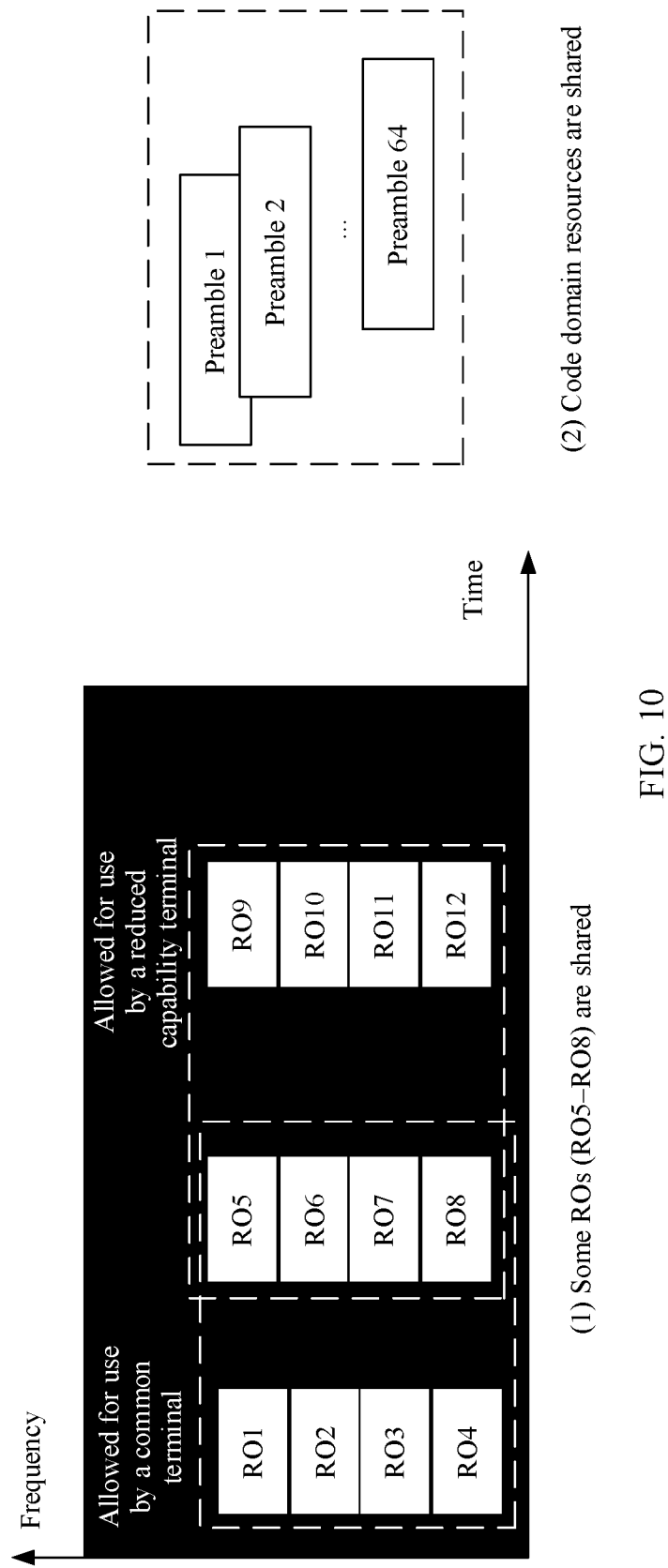
FIG. 10 to FIG. 14 are schematic diagrams of resource allocation of a random access occasion and a preamble according to an embodiment of this application.

In conclusion, for the common terminal, the first resource set that can be used by the common terminal to send the random access preamble includes RO1-RO8 shown in (1) in FIG. 10 (that is, the first RO set includes eight first ROs) and the code domain resources preambles 1-64 (the first preamble set) shared with the reduced capability terminal shown in (2) in FIG. 10. For the reduced capability terminal, the second resource set that can be used by the reduced capability terminal to send the random access preamble includes RO5-RO12 (the second RO set) shown in (1) in FIG. 10 and the preambles 1-64 (the second preamble set) shared with the common terminal shown in (2) in FIG. 10.

It can be learned that the first preamble set (preambles 1-64) is the same as the second preamble set (preambles 1-64). The first RO set (RO1-RO8) and the second RO set (RO5-RO12) share at least some ROs, and the first RO set and the second RO set have at least one different RO. Specifically, as shown in FIG. 10, at least some resources shared by the common terminal and the reduced capability terminal include: at least some ROs (that is, RO5-RO8) shared by RO1-RO8 (that is, the first RO set) and RO5-RO12 (that is, the second RO set), and the preambles 1-64 shared by the first preamble set (preambles 1-64) and the second preamble set (preambles 1-64).

2. The first resource set includes the first preamble set, and the second resource set includes the second preamble set. The first preamble set and the second preamble set share at least some preambles.

Figure 11:
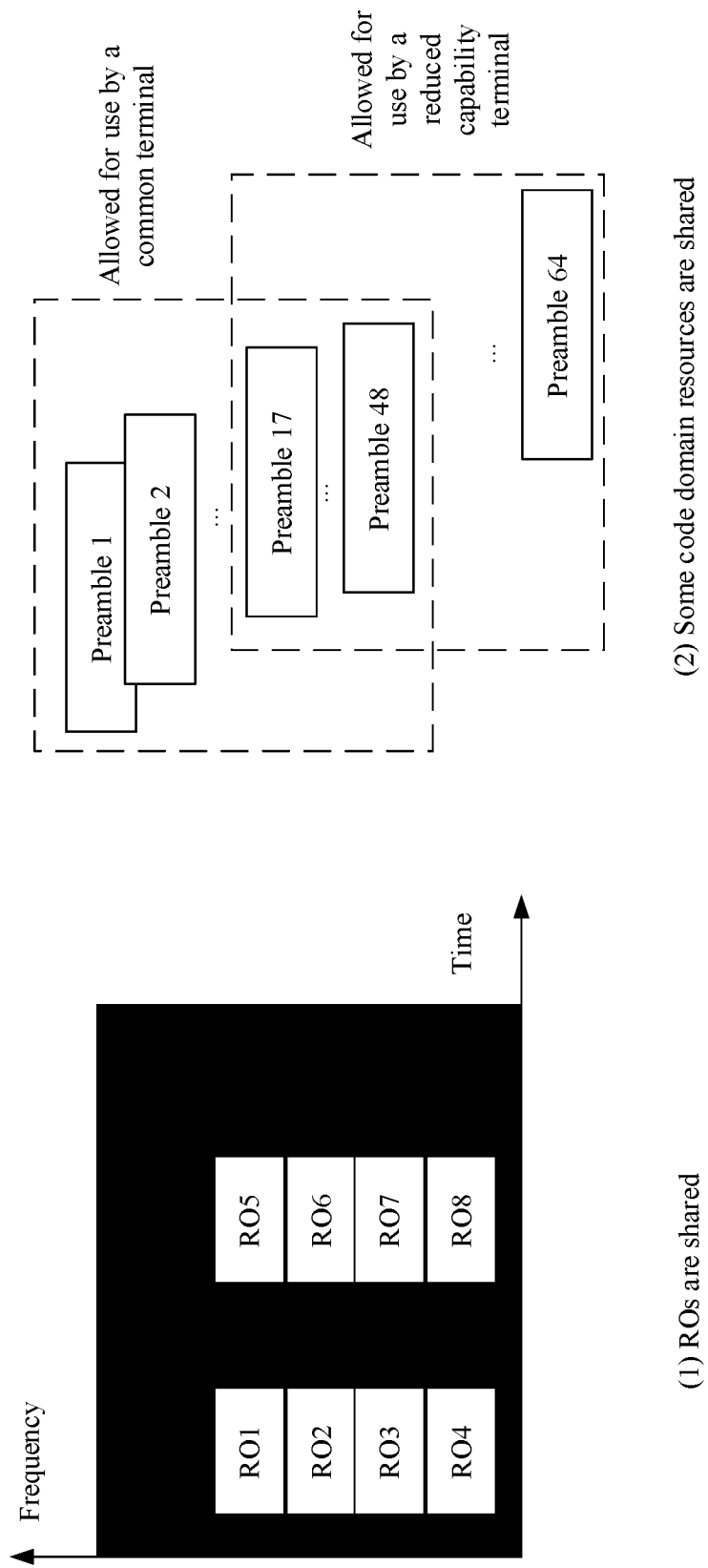

For the code domain resources preambles in the PRACH resources, for example, the network device is a base station, referring to (2) in FIG. 11, the base station indicates, in the configuration information of the system message for the common terminal, preambles 1-48 that can be used by the common terminal. The preambles 1-48 include two parts, where preambles 1-16 are preamble sequences allowed for use by only the common terminal, and preambles 17-48 are preamble sequences shared by the common terminal and the reduced capability terminal. Both the common terminal and the reduced capability terminal may use any preamble sequence in the preambles 17-48.

Optionally, the configuration information may further indicate preamble sequences (that is, the preambles 1-16) that do not belong to a shared part, and/or indicate shared preamble sequences (that is, the preambles 17-48).

Similarly, the base station indicates, in the configuration information of the system message for the reduced capability terminal, preambles 17-64 that can be used by the reduced capability terminal. The preambles 17-64 include two parts, where preambles 49-64 are preamble sequences allowed for use by only the reduced capability terminal, and preambles 17-48 are preamble sequences shared by the common terminal and the reduced capability terminal. Optionally, the configuration information may further indicate preamble sequences (that is, the preambles 49-64) that do not belong to a shared part, and/or indicate shared preamble sequences (that is, the preambles 17-48).

For the time-frequency domain resources ROs in the PRACH resources, the common terminal and the reduced capability terminal share the RO. For example, as shown in (1) in FIG. 11, the common terminal and the reduced capability terminal share RO1-RO8.

In conclusion, for the common terminal, the first resource set that can be used by the common terminal to send the random access preamble includes the time-frequency domain resources RO1-RO8 (the first RO set) shared with the reduced capability terminal shown in (1) in FIG. 11 and the code domain resources preambles 1-48 (the first preamble set) shown in (2) in FIG. 11. For the reduced capability terminal, the second resource set that can be used by the reduced capability terminal to send the random access preamble includes RO1-RO8 (the second RO set) shared with the common terminal shown in (1) in FIG. 11 and the code domain resources preambles 17-64 (the second preamble set) shown in (2) in FIG. 11.

Correspondingly, as shown in FIG. 11, at least some resources shared by the common terminal and the reduced capability terminal include: at least some preambles (that is, the preambles 17-48) shared by the first preamble set (preambles 1-48) and the second preamble set (preambles 17-64), and RO1-RO8 shared by the first RO set (RO1-RO8) and the second RO set (RO1-RO8).

3. The first resource set includes the first RO set and the first preamble set, and the second resource set includes the second RO set and the second preamble set. The first RO set and the second RO set share at least some ROs, and/or the first preamble set and the second preamble set share at least some preambles.

In some embodiments, the common terminal and the reduced capability terminal share only some ROs. In other words, the ROs that can be used by the common terminal and the ROs that can be used by the reduced capability terminal do not completely overlap. This is different from the case in FIG. 11 that available RO sets are not distinguished between the common terminal and the reduced capability terminal.

Figure 12:
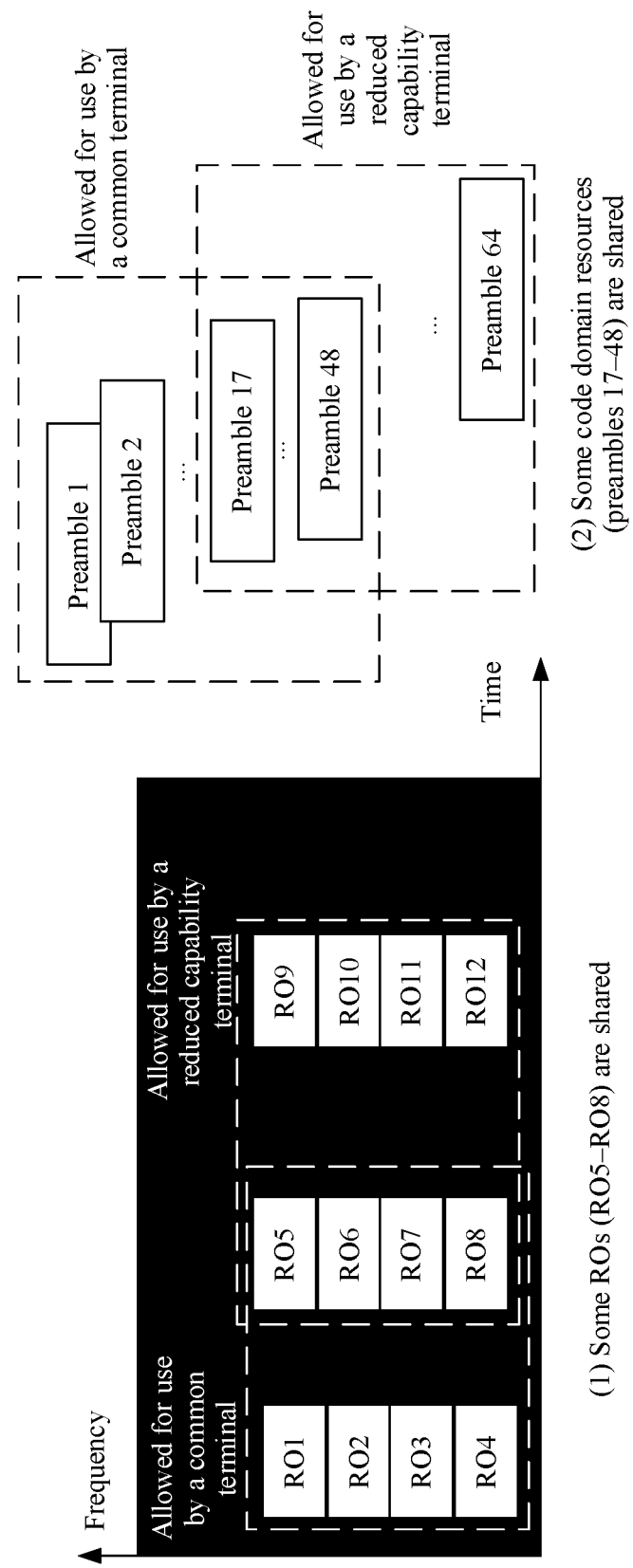

For the code domain resources preambles in the PRACH resources, as shown in (2) in FIG. 12, the common terminal may use preambles 1-48. The preambles 1-48 include two parts, where preambles 1-16 are preamble sequences allowed for use by only the common terminal, and preambles 17-48 are preamble sequences shared by the common terminal and the reduced capability terminal. The reduced capability terminal may use preambles 17-64. The preambles 17-64 include two parts, where preambles 49-64 are preamble sequences allowed for use by only the reduced capability terminal, and preambles 17-48 are preamble sequences shared by the common terminal and the reduced capability terminal.

For the time-frequency domain resources ROs in the PRACH resources, as shown in (1) in FIG. 12, the common terminal may use RO1-RO8. RO1-RO8 include two parts, where RO1-RO4 are ROs allowed for use by only the common terminal, and RO5-RO8 are ROs shared by the common terminal and the reduced capability terminal. The reduced capability terminal may use RO5-RO12. RO5-RO12 include two parts, where RO9-RO12 are ROs allowed for use by only the reduced capability terminal, and RO5-RO8 are ROs shared by the common terminal and the reduced capability terminal.

The configuration information may indicate a preamble that can be used by the common terminal and/or indicate a preamble that can be used by the reduced capability terminal, and the configuration information may further indicate an RO and/or a preamble shared by the common terminal and the reduced capability terminal.

In summary, as shown in FIG. 12, for the common terminal, the first resource set that can be used by the common terminal to send the random access preamble includes the time-frequency domain resources RO1-RO8 (that is, the first RO set) shown in (1) in FIG. 12 and the code domain resources preambles 1-48 (the first preamble set) shown in (2) in FIG. 12. For the reduced capability terminal, the second resource set that can be used by the reduced capability terminal to send the random access preamble includes RO5-RO12 (that is, the second RO set) shown in (1) in FIG. 12 and the code domain resources preambles 17-64 (the second preamble set) shown in (2) in FIG. 12.

Correspondingly, as shown in FIG. 12, at least some resources shared by the common terminal and the reduced capability terminal include: at least some preambles (that is, the preambles 17-48) shared by the first preamble set (preambles 1-48) and the second preamble set (preambles 17-64), and some ROs (RO5-RO8) shared by the first RO set (RO1-RO8) and the second RO set (RO5-RO12). It should be noted that the RO resources are divided from a time-frequency domain perspective, and the preamble resources are divided from a code domain perspective.

In some other embodiments, preamble sequences that can be used by the common terminal do not overlap preamble sequences that can be used by the reduced capability terminal, which is different from the case in FIG. 12 that some preamble sequences are shared by the common terminal and the reduced capability terminal.

Figure 13:
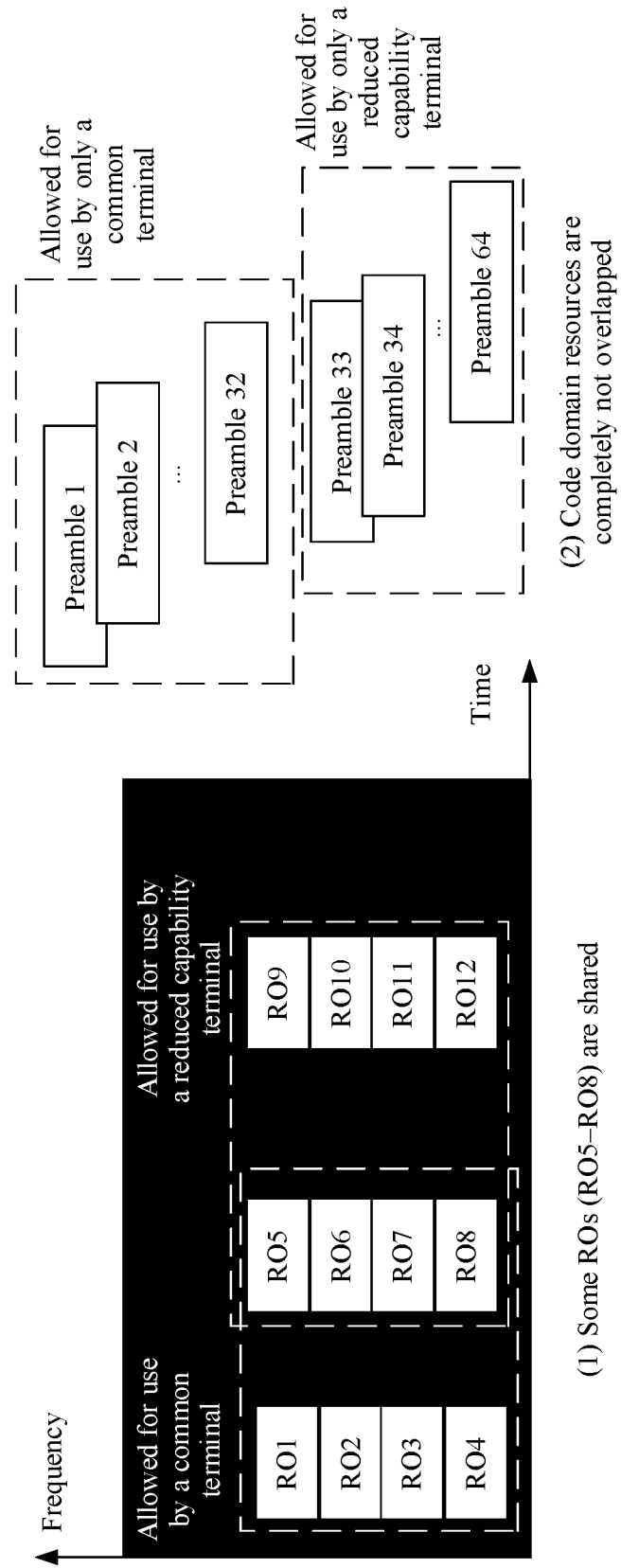

For example, for the code domain resources preambles in the PRACH resources, as shown in (2) in FIG. 13, the common terminal may use preambles 1-32. The reduced capability terminal may use preambles 33-64. It can be learned that there is no preamble sequence shared by the common terminal and the reduced capability terminal.

For the time-frequency domain resources ROs in the PRACH resources, as shown in (1) in FIG. 13, the common terminal and the reduced capability terminal share RO5-RO8. For detailed description of RO allocation, references may be made to the related description of (1) in FIG. 10 or (1) in FIG. 12.

In summary, as shown in FIG. 13, for the common terminal, the first resource set that can be used by the common terminal to send the random access preamble includes the time-frequency domain resources RO1-RO8 (the first RO set) shown in (1) in FIG. 13 and the code domain resources preambles 1-32 shown in (2) in FIG. 13. For the reduced capability terminal, the second resource set that can be used by the reduced capability terminal to send the random access preamble includes RO5-RO12 (the second RO set) shown in (1) in FIG. 13 and the code domain resources preambles 33-64 shown in (2) in FIG. 13.

Correspondingly, as shown in FIG. 13, at least some resources shared by the common terminal and the reduced capability terminal specifically refer to some ROs (RO5-RO8) shared by the first RO set (RO1-RO8) and the second RO set (RO5-RO12).

In some other embodiments, ROs that can be used by the common terminal do not overlap ROs that can be used by the reduced capability terminal, which is different from the case in FIG. 12 that some ROs are shared by the common terminal and the reduced capability terminal.

Figure 14:
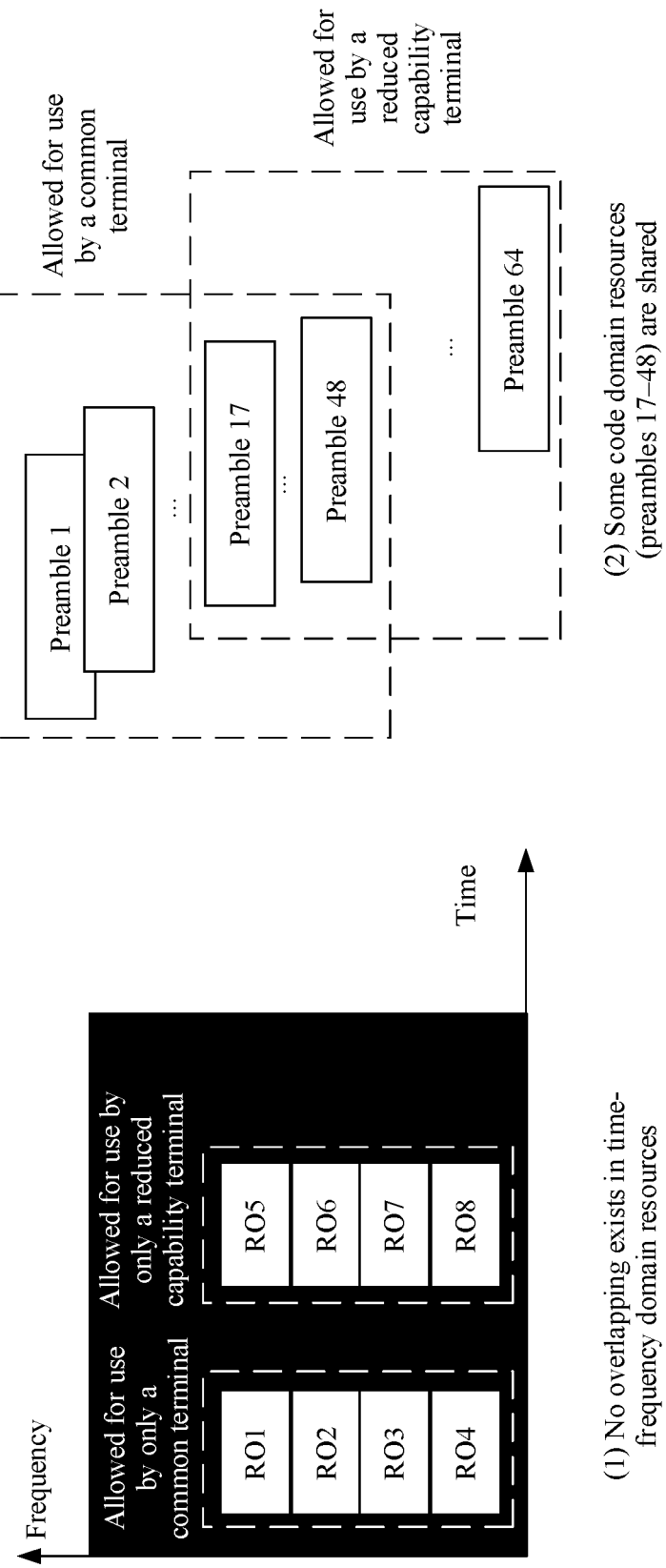

For example, for the code domain resources preambles in the PRACH resources, as shown in (2) in FIG. 14, the common terminal and the reduced capability terminal may share some code domain resources preambles 17-48. For specific code domain resource configuration of the common terminal and the reduced capability terminal, refer to related description of (2) in FIG. 12.

For the time-frequency domain resources ROs in the PRACH resources, as shown in (1) in FIG. 14, there is no RO shared by the common terminal and the reduced capability terminal.

In summary, as shown in FIG. 14, for the common terminal, the first resource set that can be used by the common terminal to send the random access preamble includes the time-frequency domain resources RO1-RO4 (there is no RO shared with the reduced capability terminal) shown in (1) in FIG. 14 and the code domain resources preambles 1-48 (the first preamble set) shown in (2) in FIG. 14. For the reduced capability terminal, the second resource set that can be used by the reduced capability terminal to send the random access preamble includes R5-RO8 shown in (1) in FIG. 14 and the code domain resources preambles 17-64 (the second preamble set) shown in (2) in FIG. 14.

Correspondingly, as shown in FIG. 14, at least some resources shared by the common terminal and the reduced capability terminal refer to at least some preambles (that is, the preambles 17-48) shared by the first preamble set (preambles 1-48) and the second preamble set (preambles 17-64).

Optionally, in this embodiment of this application, the first resource set and the second resource set have at least some resources that are not shared. In other words, the first resource set is not completely equivalent to the second resource set.

A resource shared by the common terminal and the reduced capability terminal may be referred to as a shared resource. The shared resource includes a shared RO and/or a shared preamble sequence.

S102: The terminal selects a target resource from the resource set, and sends a preamble to the network device by using the target resource.

Correspondingly, the network device receives the preamble from the terminal.

The target resource includes a target RO and a target preamble. The terminal selects the target RO and the target preamble from the resource set, and sends a target preamble on the target RO.

In a possible implementation, the terminal selects, based on the capability type of the terminal, a time-frequency domain resource and/or a code domain resource used to send the preamble.

For example, the network device is a base station. A resource set configured by the base station for the terminal by using a broadcast message is shown in FIG. 10. The terminal obtains, by monitoring and reading a corresponding field in the broadcast message, configuration information corresponding to the capability type of the terminal. Then, the terminal selects a preamble sequence (for example, selects the preamble 8 (the target preamble)) from the preambles 1-64 based on the configuration information. If the terminal is a reduced capability terminal, the terminal selects, from RO1-RO8, an RO used to send the preamble; or if the terminal is a common terminal, the terminal selects, from RO5-RO12, an RO (the target RO) used to send the preamble. After completing resource selection, the terminal may send the selected preamble 8 to the network device on the selected RO.

For another example, the resource set is shown in FIG. 11. The terminal selects, from RO1-RO8, an RO used to send the preamble. In addition, if the terminal is a reduced capability terminal, the terminal selects a preamble sequence (for example, selects a preamble 33) from the preambles 17-64. Then, the terminal may send the preamble 33 to the network device on the selected RO.

In a possible implementation, the terminal sends a message 1 to the network device, where the message 1 carries the preamble.

S103: The network device sends a random access response to the terminal.

Correspondingly, the terminal receives the random access response from the network device.

In a possible implementation, the network device sends a message 2 to the terminal, where the message 2 carries the random access response.

Optionally, the random access response includes information about a scheduling policy, and the scheduling policy includes any one or a combination of the following policies: frequency hopping or not, a frequency domain resource, a time domain resource, a modulation and coding scheme, and a transmit power control policy. For example, the random access response includes information about the scheduling policy shown in Table 2.

In some cases, after receiving the preamble from the terminal, the network device may determine, based on the target resource used by the terminal to send the preamble, whether the terminal is a common terminal or a reduced capability terminal. In a possible design, if the target resource used by the terminal to send the preamble is not in the shared resources, the base station can determine the type of the terminal based on the target resource used by the terminal to send the preamble.

Optionally, that the target resource used by the terminal to send the preamble is not in the shared resources may be that the RO used by the terminal to send the preamble is not in the shared ROs, and/or the preamble sequence used by the terminal to send the preamble is not in the shared preamble sequences. Specifically, it may be that the preamble sequence used by the terminal to send the preamble is not in the shared preamble sequences, and the RO used by the terminal to send the preamble is in the shared ROs. Alternatively, it may be that the RO used by the terminal to send the preamble is not in the shared ROs, and the preamble sequence used by the terminal to send the preamble is in the shared preamble sequences. Alternatively, the preamble sequence used by the terminal to send the preamble is not in the shared preamble sequences, and the RO used by the terminal to send the preamble is not in the shared ROs. In short, the preamble sequence used by the terminal to send the preamble is not in the shared preamble sequences, or the RO used by the terminal to send the preamble is not in the shared ROs.

For example, the network device is a base station. It is assumed that the configured resource set is shown in FIG. 10. If the base station receives the preamble from the terminal by using RO3 (not belonging to shared RO5-RO8), the base station may determine that the terminal initiating random access is a common terminal. If the base station receives the preamble from the terminal by using RO10 (not belonging to shared RO5-RO8), the base station may determine that the terminal initiating random access is a reduced capability terminal.

For another example, it is assumed that the configured resource set is shown in FIG. 11. If the preamble received by the base station from the terminal is a preamble 15 (not belonging to the shared preambles 17-48), the base station may determine that the terminal initiating random access is a common terminal. If the preamble received by the base station is a preamble 55 (not belonging to the preambles 17-48), the base station may determine that the terminal initiating random access is a reduced capability terminal.

For another example, it is assumed that the configured resource set is shown in FIG. 12. If the preamble received by the base station from the terminal by using RO6 is a preamble 15 (not belonging to the shared preambles 17-48), the base station may determine that the terminal initiating random access is a common terminal. For another example, if the preamble received by the base station from the terminal by using RO1 is a preamble 17 (belonging to the shared preambles 17-48), the base station may determine that the terminal initiating the random access is a common terminal. For another example, if the preamble received by the base station from the terminal by using RO1 is a preamble 15 (not belonging to the shared preambles 17-48), the base station may determine that the terminal initiating random access is a common terminal.

For example, it is assumed that the configured resource set is shown in FIG. 13. If the base station receives a preamble 17 (no shared preamble sequence exists) from the terminal, regardless of through which RO the base station receives the preamble 17, the base station can determine that the terminal initiating random access is a common terminal.

For example, it is assumed that the configured resource set is shown in FIG. 14. If the base station receives the preamble from the terminal through RO1 (no shared RO exists), regardless of which preamble is received by the base station through RO1, the base station can determine that the terminal initiating random access is a common terminal.

In this case, for a terminal whose capability type can be distinguished by using the message 1, the base station may use different scheduling policies for terminals of different capability types in the message 2, the message 3, and a subsequent step of random access.

In a possible design, for the reduced capability terminal, the scheduling policy delivered by the base station to the reduced capability terminal does not indicate any one or a combination of the following: frequency hopping, a frequency hopping range exceeding a bandwidth supported by the terminal, a frequency domain resource exceeding the bandwidth supported by the terminal, a modulation and coding scheme exceeding a threshold, and transmit power control exceeding a threshold. In other words, the base station indicates the reduced capability terminal that a message 2 is to be sent to the reduced capability terminal at a reduced communication rate (a rate that does not exceed a threshold), and may indicate the reduced capability terminal not to perform frequency hopping of a message 3, or indicate to perform frequency hopping of a message 3 within a bandwidth supported by the reduced capability terminal, indicate, to the terminal, a frequency domain resource that is used for the message 3 and that is within the supported bandwidth, indicate, to the terminal, a modulation and coding scheme of the message 3 that does not exceed a threshold, and indicate, to the terminal, transmit power control of the message 3 that does not exceed a threshold.

Similarly, for the common terminal, the message 2 is sent to the common terminal at a normal communication rate, and the common terminal may be indicated to schedule the message 3 by using a frequency hopping manner or a non-frequency hopping manner.

In some other cases, the network device cannot determine, based on the target resource used by the terminal to send the preamble, whether the terminal is a common terminal or a reduced capability terminal. In a possible design, if the target resource used by the terminal to send the preamble is in the shared resources, or the terminal sends the preamble by using a shared resource, the base station cannot determine the type of the terminal based on the target resource used by the terminal to send the preamble.

Optionally, that the target resource used by the terminal to send the preamble is in the shared resources may mean that the RO used by the terminal to send the preamble is in the shared ROs, and the preamble sequence used to send the preamble is in the shared preamble sequences.

For example, it is assumed that the configured resource set is shown in FIG. 10. If the base station receives the preamble from the terminal by using RO6 (in the shared ROs), the base station cannot determine the capability type of the terminal initiating random access.

For another example, as shown in FIG. 11, all ROs that can be used by the terminal to send the preamble belong to the shared ROs. In this case, when the terminal sends any preamble in the preambles 17-48 (belonging to shared preambles), the base station cannot determine the capability type of the terminal.

For another example, it is assumed that the configured resource set is shown in FIG. 12. If the base station receives a preamble 17 from the terminal by using RO6, the base station cannot determine the capability type of the terminal initiating random access.

In this case, for a terminal whose capability type cannot be distinguished by using the message 1, the base station may schedule, by using a scheduling policy of the reduced capability terminal, such a terminal initiating random access until the capability type of the terminal is learned of. Optionally, the base station sends a scheduling policy to such a terminal, where the scheduling policy does not indicate any one or a combination of the following: frequency hopping, a frequency hopping range exceeding a bandwidth supported by the terminal, a frequency domain resource exceeding the bandwidth supported by the terminal, a modulation and coding scheme exceeding a threshold, and transmit power control exceeding a threshold. For example, the base station sends the message 2 to such a terminal at a relatively low transmission rate. For another example, when scheduling the message 3 of such a terminal, the base station does not use the frequency hopping manner, or indicates that a frequency hopping location is located in the bandwidth supported by the reduced capability terminal.

Alternatively, for a terminal whose capability type cannot be distinguished by using the message 1, for example, a terminal that sends a preamble by using a shared resource, the base station may consider the terminal as a common terminal, and schedule the terminal by using a scheduling policy of the common terminal. For example, the message 2 is sent to such a terminal at a normal communication rate, and the terminal may be indicated to schedule the message 3 in the frequency hopping manner or the non-frequency hopping manner.

It can be learned that in this embodiment of this application, the base station has a relatively high degree of freedom in implementation. For a terminal whose capability type cannot be distinguished by using the message 1, the base station may consider the terminal as a common terminal, or may consider the terminal as a reduced capability terminal.

In this embodiment of this application, after receiving the random access response from the network device, the terminal may send the message 3 based on scheduling of the random access response, where the message 3 carries random access information. In different conditions, the random access information carried in the message 3 may be different. In a possible design, when the shared at least some resources include the target resource (or when the target resource is included in the shared at least some resources), the terminal performs step S104 to send first random access information. When the shared at least some resources do not include the target resource (or when the target resource is not included in the shared at least some resources), the terminal performs step S105 (not shown in FIG. 9) to send second random access information. The following separately describes steps S104 and S105.

S104: The terminal sends the first random access information when the shared at least some resources include the target resource.

Correspondingly, the network device receives the first random access information from the terminal.

The first random access information may indicate the capability type of the terminal, and the capability type of the terminal includes the first capability type or the second capability type. That is, the first random access information may indicate that the terminal is a common terminal or a reduced capability terminal.

The shared at least some resources include the target resource, that is, the resources shared by the common terminal and the reduced capability terminal include the target resource. This means that both the common terminal and the reduced capability terminal may send the preamble by using a shared resource (an RO and/or a preamble sequence), and the base station cannot accurately determine the capability type of the terminal based on the target resource used for the message 1. In this case, the terminal needs to send the first random access information that can indicate the capability type of the terminal, to assist the network device in determining the capability type of the terminal.

For example, assuming that the resource set is shown in FIG. 10, a terminal that sends a preamble on any RO in RO5-RO8 reports a capability type of the terminal by using a message such as the message 3 or another message. In this way, the base station can distinguish the capability type of the terminal accordingly.

In a possible design, the terminal sends the message 3 to the network device, where the message 3 carries the first random access information.

In a possible design, that the terminal sends the message 3 to the network device may be implemented as follows: The terminal sends the first random access information according to the scheduling policy indicated by the random access response. For example, the scheduling policy indicated by the random access response is shown in Table 2. The scheduling policy includes but is not limited to a frequency hopping flag, PUSCH frequency domain resource allocation, and the like. The terminal sends the message 3 according to the scheduling policy shown in Table 2.

In some embodiments, the first random access information may explicitly carry capability type information of the terminal, or in other words, the first random access information includes information that can indicate the type of the terminal. For example, the first random access information carries a capability type field, and a field value of the field may indicate the capability type of the terminal.

In some other embodiments, the first random access information may implicitly carry the capability type information of the terminal.

As mentioned above, because the bandwidth supported by the reduced capability terminal is limited, a gap is usually formed (or formed at a relatively high probability) in frequency hopping of the terminal, and a gap is usually not formed or formed at a relatively low probability in frequency hopping of the common terminal. Based on this feature, the base station may determine whether the terminal is a common terminal or a reduced capability terminal based on whether the random access information of the message 3 forms a gap. Specifically, that the reduced capability terminal sends the first random access information may be as follows: The terminal sends the first random access information on a first time-frequency resource, where the first time-frequency resource is discontinuous in time domain. That the common terminal sends the first random access information may be as follows: The terminal sends the first random access information on a second time-frequency resource, where the second time-frequency resource is continuous in time domain.

For example, when the message 3 (carrying the first random access information) is sent in the frequency hopping manner, the terminal sends the first random access information on the first time-frequency resource shown by a black box in FIG. 5-1. Because a working frequency needs to be adjusted, the eighth and ninth OFDM symbols shown in FIG. 5-1 cannot be sent. Therefore, the first time-frequency resource is discontinuous in time domain, and a gap is formed. In this way, the base station may determine, by detecting energy intensity of the symbol, the capability type of the terminal initiating random access. For example, the base station may determine the capability type of the terminal by detecting strength of the eighth and ninth symbols. If signals are sent on the two symbols, it indicates that the terminal is a common terminal. If no signal is sent on the eighth and ninth symbols, it indicates that the terminal is a reduced capability terminal.

For another example, the terminal sends the first random access information on a second time-frequency resource shown in the black box in FIG. 5-2. Because the common terminal does not need to adjust the working frequency, the OFDM symbol is normally sent. Therefore, the second time-frequency resource is continuous in time domain, and no gap is formed.

In addition to implicitly indicating the capability type based on the gap, there may be another manner of implicitly indicating the capability type. This is not limited in this embodiment of this application.

For example, the base station indicates different scheduling policies for terminals of different capability types. Subsequently, the base station receives the first random access information according to the scheduling policy, for example, receives the first random access information by using the frequency domain resource and the time domain resource that are shown in Table 2.

In addition, optionally, after receiving a message such as the message 3 from the terminal, the base station may determine the capability type of the terminal according to a scheduling policy (for example, a specific time-frequency resource) of the message 3.

For example, if the base station does not receive the message 3, fails to parse the message 3, or the like, the base station may schedule retransmission of the message 3 (carrying the first random access information). Optionally, the base station may determine a scheduling policy of the retransmitted message 3 based on the capability type of the terminal. The scheduling policy includes frequency hopping, a frequency domain resource, and the like. For example, if the base station determines, through symbol energy detection, that the terminal is a reduced capability terminal, when scheduling retransmission of the message 3, the base station may choose not to perform frequency hopping, or perform frequency hopping within the bandwidth range supported by the reduced capability terminal.

Optionally, the method further includes the following step S105 (not shown in FIG. 9):

S105: Send the second random access information when the shared at least some resources do not include the target resource.

The second random access information is different from the first random access information. The second random access information does not carry the capability type information of the terminal. In other words, the second random access information may not indicate the capability type of the terminal.

In a possible design, the terminal sends the message 3, where the message 3 carries the second random access information.

Optionally, that the shared at least some resources do not include the target resource may be that the shared ROs do not include an RO for sending the preamble. For example, as shown in FIG. 10, it is assumed that the RO used by the terminal to send the preamble is RO3 (not belonging to the shared RO5-RO8). In this case, the base station may determine the capability type of the terminal based on RO3 used to send the preamble, and the terminal does not need to report the capability type by using the random access information of the message 3.

Optionally, that the shared at least some resources do not include the target resource may be that the preamble sequence for sending the preamble is not included in the shared preamble sequences. For example, as shown in FIG. 11, the preamble sequence used by the terminal to send the preamble is a preamble 2 (not belonging to the shared preambles 17-48).

Optionally, that the shared at least some resources do not include the target resource may be that the RO for sending the preamble is not included in the shared ROs, and/or the preamble sequence for sending the preamble is not included in the shared preamble sequences. For example, as shown in FIG. 12, the terminal sends the preamble 17 on RO3. For another example, the terminal sends the preamble 2 on RO5. For another example, the terminal sends the preamble 2 on RO3.

Optionally, that the shared at least some resources do not include the target resource may be that the preamble sequence for sending the preamble is not included in the shared preamble sequences. For example, as shown in FIG. 13, it is assumed that the preamble sequence used by the terminal to send the preamble is a preamble 2, and the preamble 2 is not in the shared preamble sequences (that is, the preambles 17-48).

Optionally, that the shared at least some resources do not include the target resource may be that the RO for sending the preamble is not included in the shared ROs. For example, as shown in FIG. 14, it is assumed that the RO used by the terminal to send the preamble is RO1, and RO1 is not included in the shared ROs.

It may be understood that when the target resource for sending the preamble is not included in the shared at least some resources, the base station may distinguish the capability type of the terminal based on the target resource for sending the preamble. Therefore, the terminal does not need to report the capability type of the terminal by using the second random access information of the message 3.

According to the communication method provided in this embodiment of this application, for some terminals, the network device can identify capability types of the some terminals as early as possible based on the target resource for sending the preamble, so as to perform scheduling based on the capability types as early as possible. For some other terminals, the network device can identify capability types of the terminals based on the first random access information from the terminals, and schedule the terminals based on the capability types. In this solution, resources of the common terminal and resources of the reduced capability terminal do not need to be isolated, which means that the resources can be reused, a resource configuration manner is more flexible, and resource utilization is higher.

The following describes in detail configuration manners of the foregoing code domain resource preamble sequence. There may be a plurality of configuration manners of the preamble sequence. In this embodiment of this application, only the following Manner 1 and Manner 2 are listed as examples, but this does not constitute a limitation on the configuration manners.

Manner 1: The preamble sequence is configured in a bitmap manner.

The bitmap may also be referred to as a bit sequence, and may include one or more bits. Each bit in the bitmap represents a sequence number (or referred to as an index, an identifier, or the like) of one or more preambles.

The bitmap includes a bitmap that can indicate a preamble sequence allocation status of the terminal, for example, may indicate preamble resource allocation of the reduced capability terminal, and/or may indicate preamble resource allocation of the common terminal. Optionally, if a bit value is 1, it indicates that a preamble corresponding to the bit is allocated to the reduced capability terminal, and if the bit value is 0, it indicates that a corresponding preamble is not allocated to the reduced capability terminal. Alternatively, if the bit value is 0, it indicates that a preamble corresponding to the bit is allocated to the reduced capability terminal, and if the bit value is 1, it indicates that a corresponding preamble is not allocated to the reduced capability terminal.

Optionally, the bitmap further includes a bitmap that can indicate a resource shared by the reduced capability terminal and the common terminal. In this type of bitmap, a bit 1 may indicate that a preamble corresponding to the bit is a preamble shared by the reduced capability terminal and the common terminal, and a bit 0 may indicate that a preamble corresponding to the bit is not a preamble shared by the reduced capability terminal and the common terminal. Alternatively, a bit 0 may indicate that a preamble corresponding to the bit is a preamble shared by the reduced capability terminal and the common terminal, and a bit 1 may indicate that a preamble corresponding to the bit is not a preamble shared by the reduced capability terminal and the common terminal.

Figure 15:
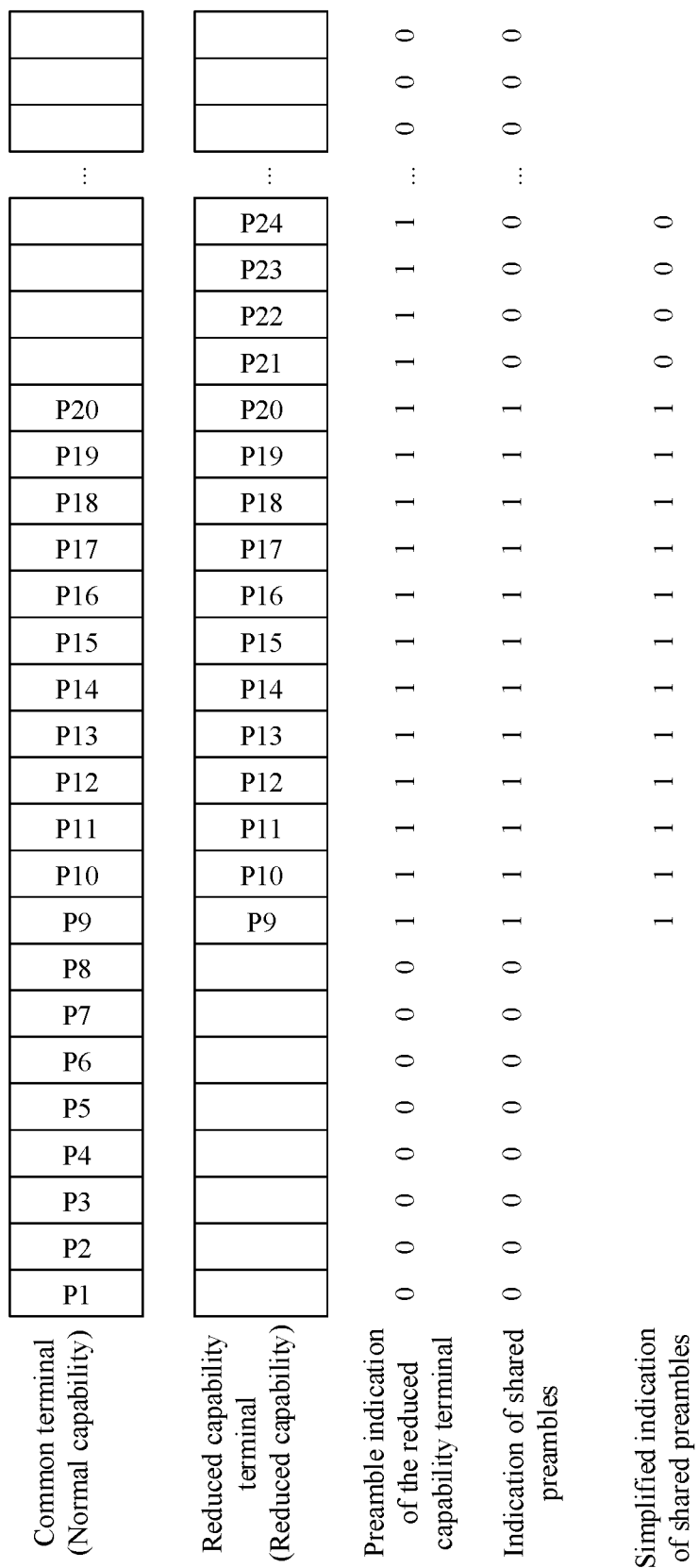
FIG. 15 to FIG. 18 are schematic diagrams of a resource indication of a preamble according to an embodiment of this application.

For example, as shown in FIG. 15, it is assumed that code domain resources preambles that can be used by the common terminal are p1-p20, code domain resources preambles that can be used by the reduced capability terminal are p9-p24, and some resources are shared by the reduced capability terminal and the common terminal (that is, p9-p20 are shared).

In this case, for example, one bit may correspond to one code domain resource preamble, and a 64-bit sequence [0, 0, 0, 0, 0, 0, 0, 0, 1, 1, 1, 1, 1, 1, 1, 1, 1, 1, 1, 1, 1, 1, 1, 0, 0, 0, . . . , 0, 0] may indicate code domain resource preamble allocation of the reduced capability terminal shown in FIG. 15. The first bit of the sequence corresponds to a code domain resource p1, the second bit corresponds to p2, and so on. A bit 1 indicates that a corresponding preamble is allocated to the reduced capability terminal, and a bit 0 indicates that a corresponding preamble is not allocated to the reduced capability terminal. The bit sequence indicates that code domain resources preambles that can be used by the reduced capability terminal are p9-p24.

It may be understood that, to reduce signaling, one bit may alternatively be used to represent a plurality of preamble sequence numbers. For example, the first bit corresponds to p1-2, the second bit corresponds to p3-4, the third bit corresponds to p5-6, and so on.

Alternatively, one bit sequence may be used to represent a preamble shared by the reduced capability terminal and the common terminal.

In an example, a 64-bit sequence [0, 0, 0, 0, 0, 0, 0, 0, 1, 1, 1, 1, 1, 1, 1, 1, 1, 1, 1, 1, 0, 0, 0, . . . , 0, 0, 0, 0] may be used to represent preambles shared by the reduced capability terminal and the common terminal shown in FIG. 15. The first bit of the sequence corresponds to p1, the second bit corresponds to p2, and so on. A bit '1' represents that a corresponding preamble is a preamble shared by the common terminal and the reduced capability terminal, and a bit '0' represents that a corresponding preamble is not a preamble shared by the common terminal and the reduced capability terminal. The sequence indicates that p9-p20 are preambles shared by the common terminal and the reduced capability terminal.

Alternatively, simplified signaling may indicate the preamble shared by the reduced capability terminal and the common terminal. For example, still as shown in FIG. 15, 16 preambles are allocated to the reduced capability terminal, and the first 12 preambles are preambles shared by the reduced capability terminal and the common terminal. In this case, a bitmap [1, 1, 1, 1, 1, 1, 1, 1, 1, 1, 1, 1, 0, 0, 0, 0] with a length of 16 may indicate preambles that are shared by the reduced capability terminal and the common terminal and that are in the preambles allocated to the reduced capability terminal. The first bit of the sequence corresponds to the first preamble (that is, p9) allocated to the reduced capability terminal, the second bit corresponds to the second preamble (that is, p10) allocated to the reduced capability terminal, and so on. A bit '1' represents that a corresponding preamble is a preamble shared by the common terminal and the reduced capability terminal, and a bit '0' represents that a corresponding preamble does not belong to a shared preamble.

In some other embodiments, the preambles may be further divided into a plurality of groups (group). Optionally, different groups of preambles may be used for different purposes. For example, a preamble in a group A is used for contention-based random access, and a preamble in a group B is used for non-contention-based random access.

Optionally, for each group of preambles, a bitmap may be used to represent preamble resource allocation and/or a shared preamble.

Figure 16:
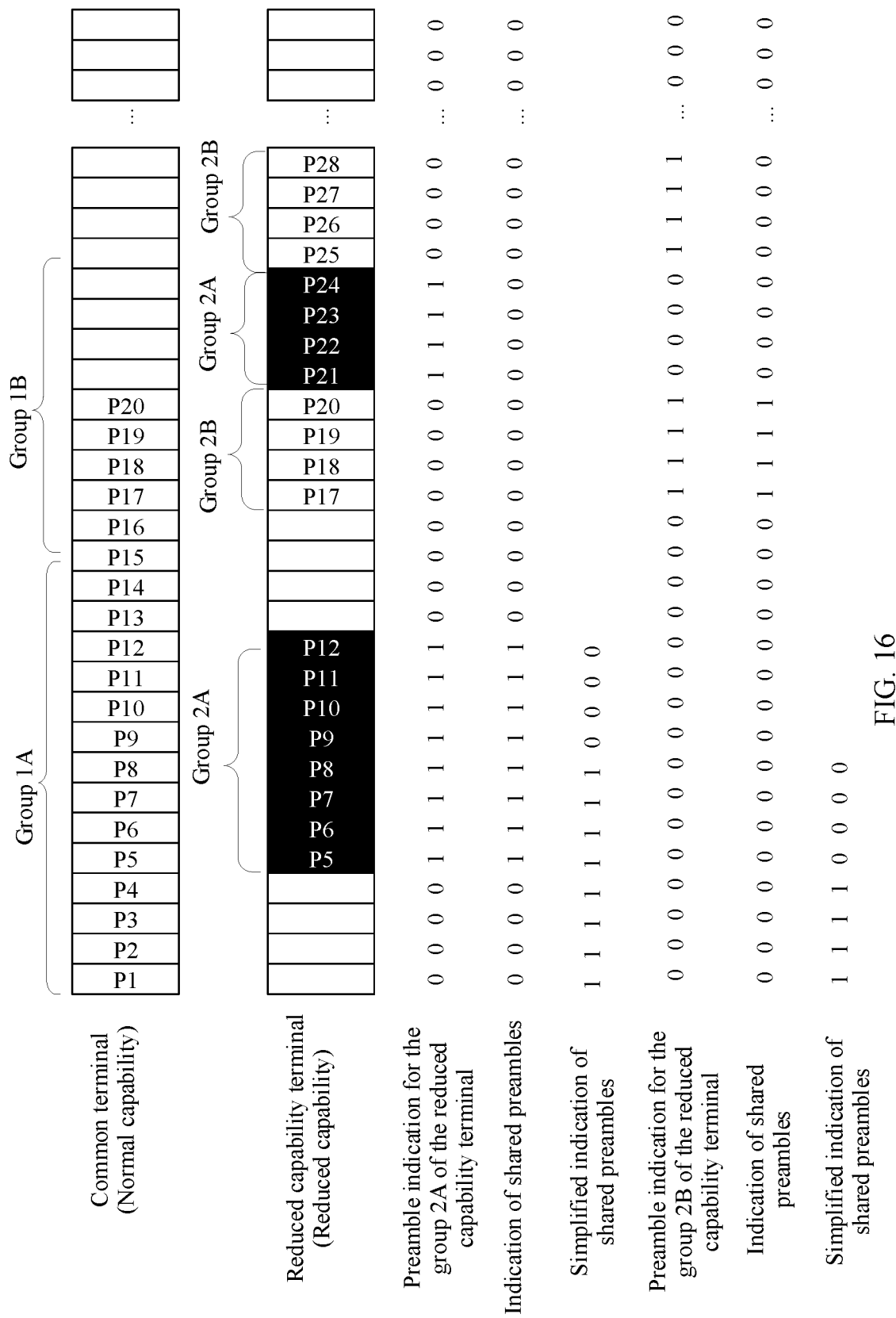

For example, as shown in FIG. 16, a quantity of preambles that can be used by the common terminal for random access is N=20, and these preambles are divided into two groups: 1A and 1B. Preambles 1-12 belong to the group 1A, and a quantity of preambles included in the group 1A is N1=12. Preambles 13-20 belong to the group 1B, and a quantity of preambles included in the group 1B is 8.

Still as shown in FIG. 16, preambles that can be used by the reduced capability terminal for random access are also divided into two groups: 2A and 2B, where code domain resources preambles of the group 2A are p5-p12 and p21-p24. In this case, a 64-bit bitmap [0, 0, 0, 0, 1, 1, 1, 1, 1, 1, 1, 1, 0, 0, 0, 0, 0, 0, 0, 0, 1, 1, 1, 1, 0, 0, . . . , 0, 0, 0] may be used to represent the preambles of the group 2A. The first bit in the sequence corresponds to p1, the second bit corresponds to p2, and so on. A bit '1' indicates that a corresponding preamble is allocated to the group 2A, and a bit '0' indicates that a corresponding preamble is not allocated to the group 2A.

In addition, in the group 2A, the sequences p5-p12 are shared by the reduced capability terminal and the common terminal. Therefore, a 64-bit bitmap [0, 0, 0, 0, 1, 1, 1, 1, 1, 1, 1, 1, 0, 0, 0, . . . , 0, 0, 0] may indicate the preambles shared by the reduced capability terminal and the common terminal. Alternatively, to reduce signaling, a bitmap [1, 1, 1, 1, 1, 1, 1, 1, 0, 0, 0, 0] with a length of 12 may indicate the preambles that are shared by the reduced capability terminal and the common terminal and that are in the group 2A. The first bit of the 12-bit bitmap corresponds to the first preamble (that is, p5) in the group 2A, the second bit corresponds to the second preamble (that is, p6) in the group 2A, and so on. A bit '1' represents that a corresponding preamble is a preamble shared by the common terminal and the reduced capability terminal, and a bit '0' represents that a corresponding preamble does not belong to a shared preamble.

Similarly, preamble resources in the group 2B are p17-p20 and p25-p28, and a 64-bit bitmap [0, 0, 0, 0, 0, 0, 0, 0, 0, 0, 0, 0, 0, 0, 0, 0, 1, 1, 1, 1, 0, 0, 0, 0, 1, 1, 1, 1, 0, 0, . . . , 0, 0, 0] may be used to represent the preambles allocated to the group 2B. In the group 2B, p17-p20 are the preambles shared by the reduced capability terminal and the common terminal, and a 64-bit bitmap [0, 0, 0, 0, 0, 0, 0, 0, 0, 0, 0, 0, 0, 0, 0, 0, 1, 1, 1, 1, 0, 0, . . . , 0, 0, 0] may indicate the preambles shared by the reduced capability terminal and the common terminal. Alternatively, to reduce signaling, a bitmap [1, 1, 1, 1, 0, 0, 0, 0] with a length of 8 may indicate the preambles that are shared by the reduced capability terminal and the common terminal and that are in the group 2B.

Manner 2: A start+length indication (start and length indication) manner indicates the preamble configuration.

Start (start) is a start point or a start location of an allocated preamble resource, and length (length) is a length of the allocated preamble resource. A preamble resource allocated to the reduced capability terminal and/or a preamble resource allocated to the common terminal may be indicated by indicating a start location and a length of the preamble resource.

Figure 17:
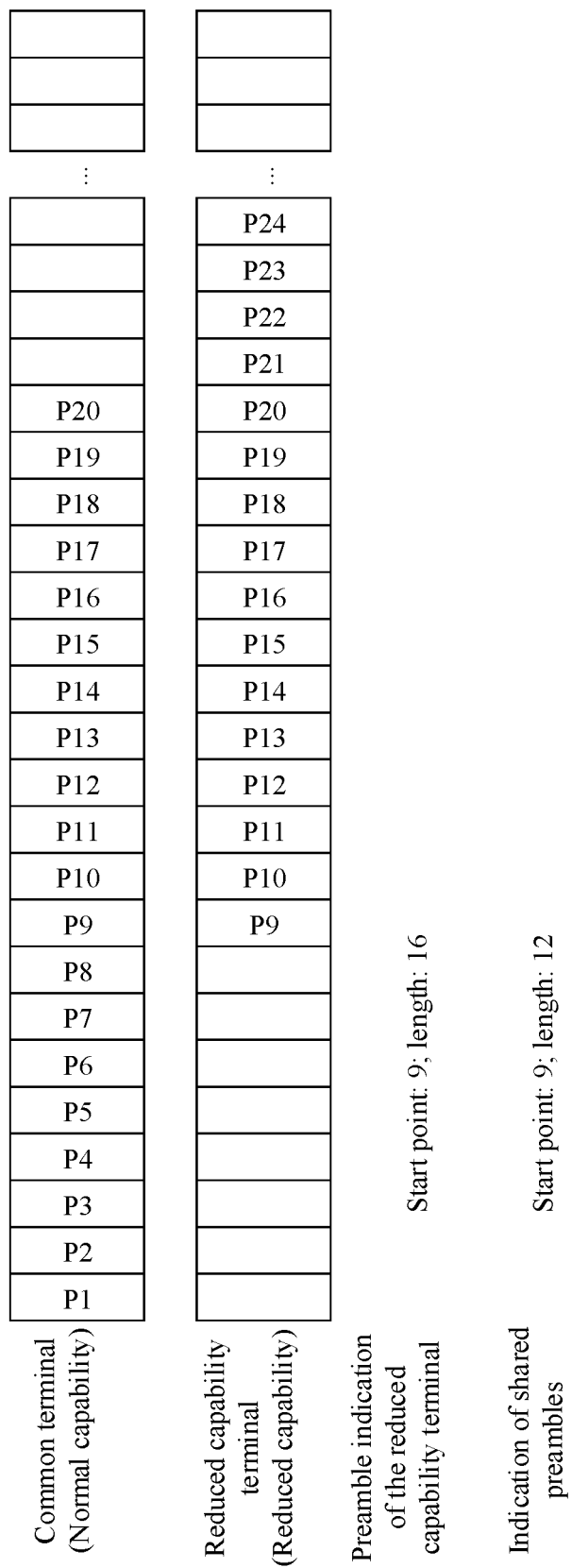

For example, as shown in FIG. 17, it is assumed that preambles that can be used by the common terminal are configured as p1-p20, and preamble resources that can be used by the reduced capability terminal are configured as p9-p24, where p9-p20 are shared by the two terminals. In this case, start=9 and length=16 may indicate preamble resource allocation for the reduced capability terminal, where start=9 indicates that a start location of a preamble resource of the terminal is p9, and an allocated length being 16 means that 16 consecutive preambles starting from p9 are allocated to the reduced capability terminal.

Optionally, a preamble resource shared by the common terminal and the reduced capability terminal may be indicated by indicating a start location and a length of the preamble resource. For example, still as shown in FIG. 17, start=9 and length=12 may be used to represent the preambles shared by the reduced capability terminal and the common terminal. This means that 12 consecutive preambles starting from p9 are preambles shared by the reduced capability terminal and the common terminal.

In some other embodiments, the preambles may be divided into a plurality of groups. In this case, for each group, preamble resource allocation and a shared preamble of the group may be represented in a manner of a start point and a length.

Figure 18:
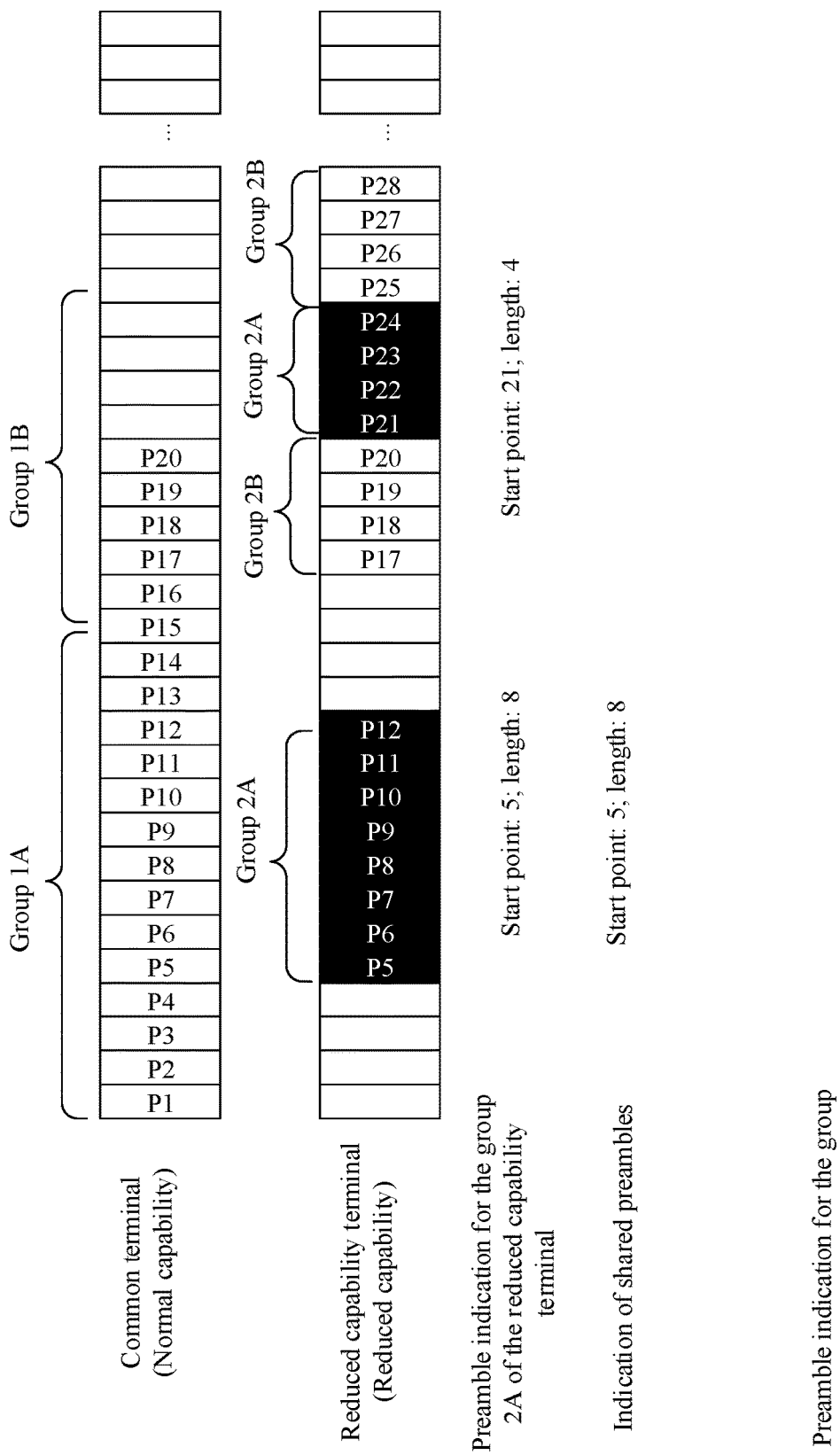

For example, as shown in FIG. 18, a quantity of preambles that can be used by the common terminal for random access is N=20, and the preambles are divided into two groups: 1A and 1B. Preambles 1-12 belong to the group 1A, a quantity of preambles included in the group 1A is N1=12, preambles 13-20 belong to the group 1B, and a quantity of preambles included in the group 1B is 8.

Preambles that can be used by the reduced capability terminal for random access are also divided into two groups: 2A and 2B, and {start location: 5, length: 8} and {start location: 21, length: 4} may indicate preamble resources allocated to the group 2A, that is, eight consecutive preambles starting from a preamble 5 and four consecutive preambles starting from a preamble 21 are allocated to the group 2A.

It should be noted that because the preamble resources in the group 2A are divided into two parts, two groups of {start location+length} are required to represent a resource allocation status of the group 2A. That is, preamble resources in a same group may be allocated to a plurality of intervals, preamble numbers in each interval may be consecutive, and the base station may separately indicate locations of the intervals.

In addition, {start location: 5, length: 8} may indicate preambles, that is, p5-p12, shared by the reduced capability terminal and the common terminal.

Similarly, {start location: 17, length: 4} and {start location: 25, length: 4} may indicate preamble resources allocated to the group 2B, that is, four consecutive preambles starting from a preamble 17 and four consecutive preambles starting from a preamble 25 are allocated to the group 2B. In addition, {start location: 17, length: 4} may indicate the preambles shared by the reduced capability terminal and the common terminal.

In some other embodiments, the start location (or the length) may be used by default (for example, predefined by a protocol). In this case, an allocated preamble can be determined only by indicating the length (or the start location). For example, it is specified that the start location is p1. In this case, it can be determined that the allocated resources are p1-p16 provided that the length, for example, 16, is indicated. In this way, signaling overheads can be reduced.

In some other embodiments, the start point and the length may be mapped to a value, for example, through joint coding. Then, the allocated preamble can be determined only by indicating the mapped value (for example, the value is carried in a broadcast message). Therefore, signaling overheads can be reduced. For example, V=10*S+L, where S is the start point, L is the length, and V is a value obtained after joint coding. A formula used for joint coding is not limited to V=10*S+L herein, and may be another formula. This is not limited in this embodiment of this application.

The foregoing mainly describes the preamble configuration manner by using an example in which the preamble resource is allocated to the reduced capability terminal. For a preamble resource allocation manner of the common terminal, refer to the preamble resource allocation manner of the reduced capability terminal.

In some other embodiments, the network device may further obtain capability information reported by the terminal, and learn of the capability type of the terminal based on the capability information. The capability information includes but is not limited to information such as a bandwidth supported by the terminal and an antenna configuration. For example, the capability information reported by the terminal is that the bandwidth supported by the terminal is 20 MHz, and one receive antenna is configured. In this case, the base station determines, based on the capability information, that the terminal is a reduced capability terminal. In this way, when the terminal initiates random access, the terminal can be scheduled as early as possible based on the capability type of the terminal, so as to improve communication performance of the terminal.

It should be noted that a plurality of pieces of information and the like mentioned in this embodiment of this application may be carried in a plurality of messages, or may be carried in one message. For example, RO set information and preamble set information may be carried in one broadcast message. Alternatively, information such as an RO set and a preamble set may be separately carried in a plurality of broadcast messages.

Figure 19:
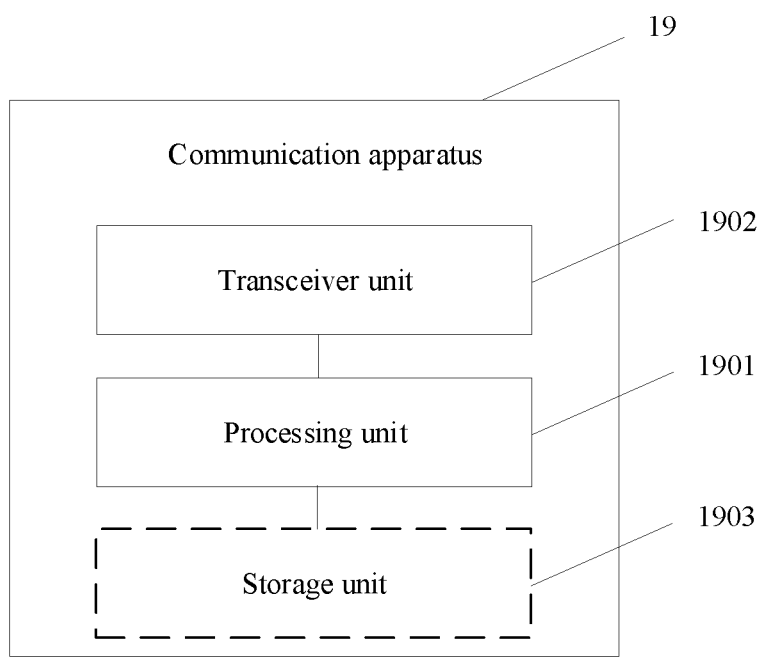
FIG. 19 is a schematic diagram of a structure of a communication apparatus according to an embodiment of this application.

When each function module is obtained through division based on each corresponding function, FIG. 19 is a possible schematic diagram of a structure of a communication apparatus 19 involved in the foregoing embodiments. The apparatus may implement a function of the foregoing terminal (for example, which may be a terminal or a chip). Alternatively, the apparatus implements a function of the network device (for example, which may be a network device or a chip). The communication apparatus 19 includes a processing unit 1901 and a transceiver unit 1902.

For example, the communication apparatus 19 is a terminal device. The processing unit 1901 is configured to perform S101 (for example, control the transceiver unit 1902 to receive configuration information) and S102 in FIG. 9, and/or is configured to perform another step in the foregoing method embodiment. The transceiver unit 1902 is configured to support the terminal device in performing S103 and S104 (or S105) in FIG. 9.

For example, the communication apparatus 19 is a network device. The processing unit 1901 is configured to determine the configuration information, and/or is configured to perform another step in the foregoing method embodiment. The transceiver unit 1902 is configured to support the network device in performing S103 and S104 (or S105) in FIG. 9.

Optionally, the communication apparatus 19 may further include a storage unit 1903, configured to store data, a program, and the like.

All related content of each step involved in the foregoing method embodiment may be referenced to a function description of a corresponding function module, and details are not described herein again.

An embodiment of this application further provides a communication apparatus. The communication apparatus is configured to implement the foregoing communication methods. The communication apparatus includes a corresponding module, unit, or means for implementing the foregoing communication method. The module, unit, or means may be implemented by hardware, software, or hardware executing corresponding software. The hardware or the software includes one or more modules or units corresponding to the foregoing function.

An embodiment of this application provides a chip system. The chip system includes a processor and an input/output port. The processor is configured to implement a processing function involved in the communication method in the foregoing method embodiment, and the input/output port is configured to implement a transceiving function involved in the communication method in the foregoing method embodiment.

In a possible design, the chip system further includes a memory, and the memory is configured to store program instructions and data that implement a function involved in any foregoing communication method.

The chip system may include a chip, or may include a chip and another discrete device.

An embodiment of this application provides a communication system. The system includes the foregoing one or more terminal devices and one or more network devices.

An embodiment of this application provides a computer-readable storage medium. The computer-readable storage medium stores computer instructions. When the computer instructions are run on a computer, the computer is enabled to perform the communication method in the foregoing method embodiment.

An embodiment of this application provides a computer program product including instructions. The computer program product includes a computer program or instructions. When the computer program or the instructions are run on a computer, the computer is enabled to perform the communication method in the foregoing method embodiment.

It should be understood that, the processor in embodiments of this application may be a central processing unit (CPU), or the processor may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It may be understood that the memory in embodiments of this application may be a volatile memory or a nonvolatile memory, or may include a volatile memory and a nonvolatile memory. For example, the nonvolatile memory may be a read-only memory (read-only memory, ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of random access memories (RAM) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented using software, hardware (for example, circuit), firmware, or any combination thereof. When software is used to implement embodiments, the foregoing embodiments may be implemented completely or partially in a form of a computer program product. The computer program product includes one or more computer instructions or computer programs. When the program instructions or the computer programs are loaded and executed on the computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, infrared, radio, microwave, or the like) manner. The computer-readable storage medium may be any usable medium accessible by a computer, or a data storage device, such as a server or a data center including one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that in various embodiments of this application, sequence numbers of the foregoing processes do not mean a sequence of execution. The execution sequence of the processes should be determined based on functions and internal logic of the processes, and should not constitute any limitation on an implementation process of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a specific work process of the system, apparatus, and unit described above, reference may be made to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located at one location, or may be distributed on a plurality of network units. Some or all of the units may be selected depending on actual requirements to achieve the objectives of the solutions in the embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, wherein the method comprises:
    obtaining configuration information, wherein the configuration information indicates a resource set, the resource set comprises at least one of a first resource set or a second resource set, the first resource set comprises preamble resources for a terminal of a first capability type, the second resource set comprises preamble resources for a terminal of a second capability type, and the first resource set and the second resource set share at least one resource;
    selecting a target resource from the resource set, and sending a preamble by using the target resource;
    receiving a random access response; and
    sending first random access information when the shared at least one resource comprises the target resource, wherein the first random access information indicates a capability type of a terminal, and the capability type of the terminal comprises the first capability type or the second capability type.

2. The communication method according to claim 1, wherein
    the first resource set comprises a first random access occasion (RO) set, and the first RO set comprises at least one first RO; the second resource set comprises a second RO set, and the second RO set comprises at least one second RO; and the first RO is an RO for a terminal of the first capability type, and the second RO is an RO for a terminal of the second capability type; or
    the first resource set comprises a first preamble set, the first preamble set comprises at least one first preamble, and the first preamble is a preamble for a terminal of the first capability type; and the second resource set comprises a second preamble set, the second preamble set comprises at least one second preamble, and the second preamble is a preamble for a terminal of the second capability type; and
    that the first resource set and the second resource set share at least one resource comprises: the first RO set and the second RO set share at least one RO, or the first preamble set and the second preamble set share at least one preamble.

3. The communication method according to claim 2, wherein the configuration information further indicates the at least one RO shared by the first RO set and the second RO set, or the at least one preamble shared by the first preamble set and the second preamble set, or the at least one RO shared by the first RO set and the second RO set and the at least one preamble shared by the first preamble set and the second preamble set.

4. The communication method according to claim 1, wherein the sending first random access information comprises:
    sending the first random access information on a first time-frequency resource, wherein the first time-frequency resource is discontinuous in time domain; or
    sending the first random access information on a second time-frequency resource, wherein the second time-frequency resource is continuous in time domain.

5. The communication method according to claim 1, wherein the random access response comprises information about a scheduling policy, and the scheduling policy comprises at least one of the following policies: frequency hopping or not, a frequency domain resource, a time domain resource, a modulation and coding scheme, or a transmit power control policy.

6. The communication method according to claim 5, wherein the sending first random access information comprises:
    sending the first random access information according to the scheduling policy indicated by the random access response.

7. The communication method according to claim 5, wherein when the shared at least one resource comprises the target resource, the scheduling policy does not indicate any one of the following: frequency hopping, a frequency hopping range exceeding a bandwidth supported by the terminal, a frequency domain resource exceeding the bandwidth supported by the terminal, a modulation and coding scheme exceeding a threshold, and transmit power control exceeding a threshold.

8. A communication method, wherein the method comprises:
    sending configuration information, wherein the configuration information indicates a resource set, the resource set comprises at least one of a first resource set or a second resource set, the first resource set comprises preamble resources for a terminal of a first capability type, the second resource set comprises preamble resources for a terminal of a second capability type, and the first resource set and the second resource set share at least one resource;
    receiving a preamble by using a target resource in the resource set;
    sending a random access response; and
    receiving first random access information when the shared at least one resource comprises the target resource, wherein the first random access information indicates a capability type of a terminal, and the capability type of the terminal comprises the first capability type or the second capability type.

9. The communication method according to claim 8, wherein
the first resource set comprises a first random access occasion (RO) set, and the first RO set comprises at least one first RO; the second resource set comprises a second RO set, and the second RO set comprises at least one second RO; and the first RO is an RO for a terminal of the first capability type, and the second RO is an RO for a terminal of the second capability type; or
the first resource set comprises a first preamble set, the first preamble set comprises at least one first preamble, and the first preamble is a preamble for a terminal of the first capability type; and the second resource set comprises a second preamble set, the second preamble set comprises at least one second preamble, and the second preamble is a preamble for a terminal of the second capability type; and
that the first resource set and the second resource set share at least one resource comprises: the first RO set and the second RO set share at least one RO, or the first preamble set and the second preamble set share at least one preamble.

10. The communication method according to claim 9, wherein the target resource comprises a target RO and a target preamble; and
that the shared at least one resource comprises the target resource comprises: the at least one RO shared by the first RO set and the second RO set comprises the target RO, and the at least one preamble shared by the first preamble set and the second preamble set comprises the target preamble.

11. The communication method according to claim 8 wherein the receiving first random access information comprises:
receiving the first random access information on a first time-frequency resource, wherein the first time-frequency resource is discontinuous in time domain; or
receiving the first random access information on a second time-frequency resource, wherein the second time-frequency resource is continuous in time domain.

12. The communication method according to claim 8, wherein the random access response comprises information about a scheduling policy, and the scheduling policy comprises at least one of the following policies: frequency hopping or not, a frequency domain resource, a time domain resource, a modulation and coding scheme, or a transmit power control policy.

13. The method according to claim 12, wherein the receiving first random access information comprises:
receiving the first random access information according to the scheduling policy.

14. The communication method according to claim 12, wherein when the shared at least one resource comprises the target resource, the scheduling policy does not indicate any one of the following: frequency hopping, a frequency hopping range exceeding a bandwidth supported by the terminal, a frequency domain resource exceeding the bandwidth supported by the terminal, a modulation and coding scheme exceeding a threshold, and transmit power control exceeding a threshold.

15. A terminal device, comprising: one or more processors and one or more memories, wherein
the one or more memories are coupled to the one or more processors, the one or more memories are configured to store computer program code, the computer program code comprises computer instructions, and when the one or more processors execute the computer instructions, the terminal device is enabled to perform operations comprising:
obtaining configuration information, wherein the configuration information indicates a resource set, the resource set comprises at least one of a first resource set or a second resource set, the first resource set comprises preamble resources for a terminal of a first capability type, the second resource set comprises preamble resources for a terminal of a second capability type, and the first resource set and the second resource set share at least one resource;
selecting a target resource from the resource set, and sending a preamble by using the target resource;
receiving a random access response; and
sending first random access information when the shared at least one resource comprises the target resource, wherein the first random access information indicates a capability type of the terminal device, and the capability type of the terminal device comprises the first capability type or the second capability type.

16. A network device, comprising: one or more processors and one or more memories, wherein
the one or more memories are coupled to the one or more processors, the one or more memories are configured to store computer program code, the computer program code comprises computer instructions, and when the one or more processors execute the computer instructions, the network device is enabled to perform the method according to claim 8.

17. A computer-readable storage medium, wherein the computer-readable storage medium stores computer-executable instructions, and when invoked by a computer, the computer-executable instructions are used to enable the computer to perform the method according to claim 1.

18. A computer-readable storage medium, wherein the computer-readable storage medium stores computer-executable instructions, and when invoked by a computer, the computer-executable instructions are used to enable the computer to perform the method according to claim 8.

19. A computer program product comprising instructions, wherein when the computer program product is run on a computer, the computer is enabled to perform the method according to claim 1.

20. A chip, wherein the chip is coupled to a memory and is configured to read and execute program instructions stored in the memory, to implement the method according to claim 1.

* * * * *